US011496685B2

(12) United States Patent
Koreki et al.

(10) Patent No.: US 11,496,685 B2
(45) Date of Patent: Nov. 8, 2022

(54) INFORMATION PROCESSING SYSTEM, INFORMATION PROCESSING METHOD, MEDIUM, AND MANAGEMENT DEVICE

(71) Applicant: CASIO COMPUTER CO., LTD., Tokyo (JP)

(72) Inventors: Taku Koreki, Hino (JP); Kazuaki Hagiwara, Koshigaya (JP); Kazunori Yanagi, Akishima (JP); Kunihiko Ohnaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 166 days.

(21) Appl. No.: 17/006,185

(22) Filed: Aug. 28, 2020

(65) Prior Publication Data

US 2021/0067700 A1    Mar. 4, 2021

(30) Foreign Application Priority Data

Aug. 29, 2019 (JP) .............................. JP2019-157044
Feb. 12, 2020 (JP) .............................. JP2020-021841

(51) Int. Cl.
*H04N 5/232*    (2006.01)
*H04N 1/00*    (2006.01)
*H04N 101/00*    (2006.01)

(52) U.S. Cl.
CPC ..... *H04N 5/23293* (2013.01); *H04N 1/00153* (2013.01); *H04N 1/00164* (2013.01);
(Continued)

(58) Field of Classification Search
CPC ........... H04N 1/00129; H04N 1/00153; H04N 1/00164; H04N 1/00244; H04N 1/00334;
(Continued)

(56) References Cited

U.S. PATENT DOCUMENTS

2016/0295092 A1* 10/2016 Yamashita ......... H04N 5/23203
2019/0149714 A1* 5/2019 Yuan ................ G08B 13/19671
348/143

FOREIGN PATENT DOCUMENTS

JP    2007096855 A    4/2007
JP    2014092831 A    5/2014
(Continued)

OTHER PUBLICATIONS

Japanese Office Action (and English language translation thereof) dated Nov. 2, 2021 issued in counterpart Japanese Application No. 2020-021841.

*Primary Examiner* — Daniel M Pasiewicz
(74) *Attorney, Agent, or Firm* — Holtz, Holtz & Volek PC

(57) ABSTRACT

The present invention is to realize a simple communication connection. A shooting system S includes: a display device 2 configured to change identifiers periodically so as to present an identifier; a management server 1 configured to share the identifier with the display device 2; and a user terminal 4 configured to acquire the identifier presented on the display device 2 when an identifier acquisition operation by a user is detected, and to transmit, to the management server 1, the acquired identifier and an operation instruction to operate a camera 3 identified by the acquired identifier. The management server 1 includes an information control block 114 which performs control to associate image data acquired with the camera 3 based on the operation instruction transmitted by the user terminal 4 with the identifier presented on the display device 2 when the identifier acquisition operation by the user is detected.

19 Claims, 25 Drawing Sheets

(52) U.S. Cl.
CPC ..... *H04N 1/00244* (2013.01); *H04N 1/00334* (2013.01); *H04N 1/00344* (2013.01); *H04N 5/23206* (2013.01); *H04N 2101/00* (2013.01); *H04N 2201/0084* (2013.01); *H04N 2201/0094* (2013.01); *H04N 2201/0096* (2013.01)

(58) Field of Classification Search
CPC ........... H04N 1/00344; H04N 5/23206; H04N 5/23293
See application file for complete search history.

(56) References Cited

FOREIGN PATENT DOCUMENTS

| JP | 2016189518 A | 11/2016 |
|----|--------------|---------|
| JP | 2017201752 A | 11/2017 |
| JP | 2019110602 A | 7/2019  |

\* cited by examiner

FIG. 22

| CODE ID | COUNT FLAG |
|---|---|
| 00120 | 0 |
| 00121 | 1 |
| 00122 | 1 |
| • | • |
| • | • |
| • | • |
| • | • |
| • | • |
| • | • |
| • | • |
| • | • |
| • | • |
| 00159 | 0 |

1822

| CODE ID | USER ID | TRANSMISSION TIME OF BEING READY TO WAIT | WAITING FLAG |
|---|---|---|---|
| 00120 | abc1 | 10:10 | 0 |
| 00121 | efg1 | 10:12 | 1 |
| 00122 | abc1 | 11:30 | 1 |
| 00121 | abc1 | 12:00 | 1 |
| • | • | • | • |
| • | • | • | • |
| • | • | • | • |
| • | • | • | • |
| • | • | • | • |
| • | • | • | • |
| • | • | • | • |
| • | • | • | • |

1823

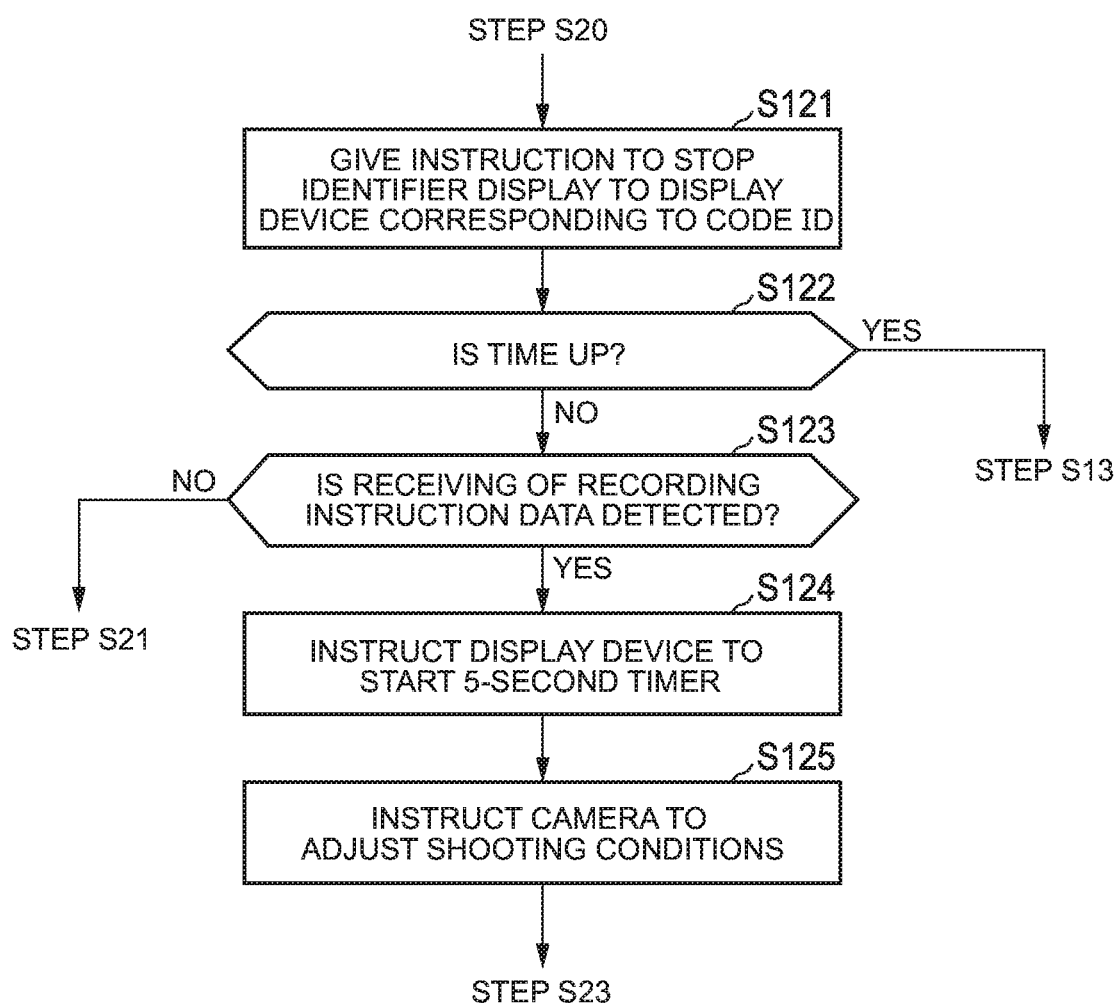

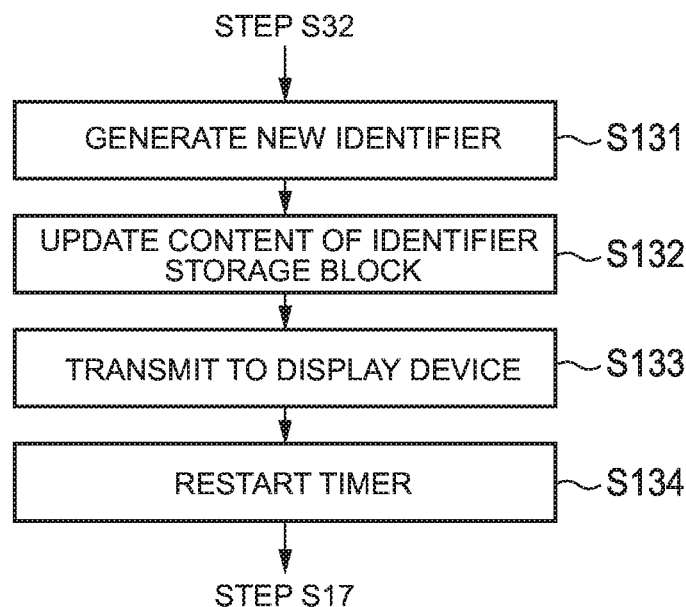
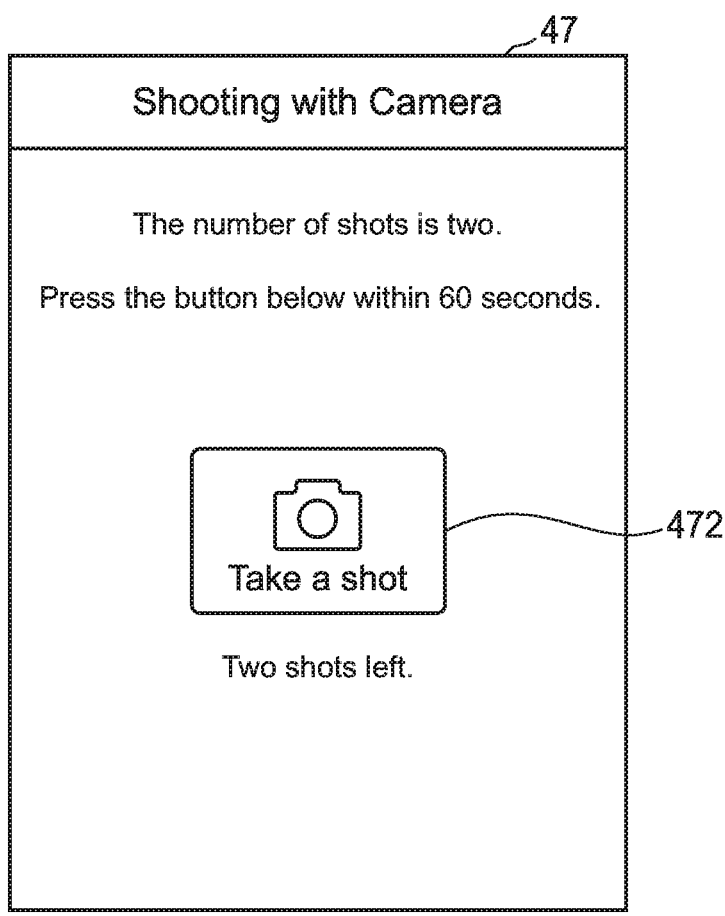

FIG. 28
List of Captured Photos
Shooting is ended. Give way to the next person.
Long press image to save and download the image.
The image will be saved in download folder.
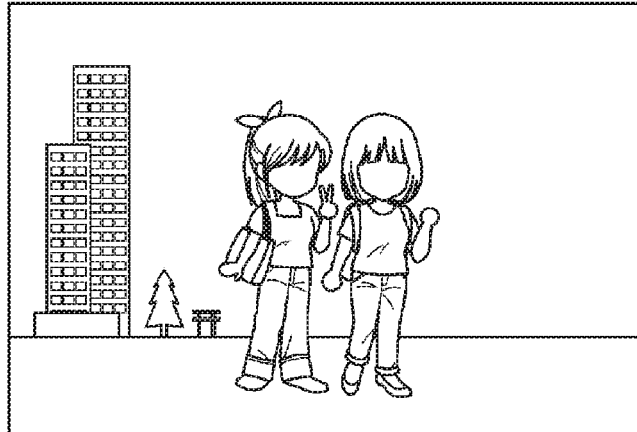
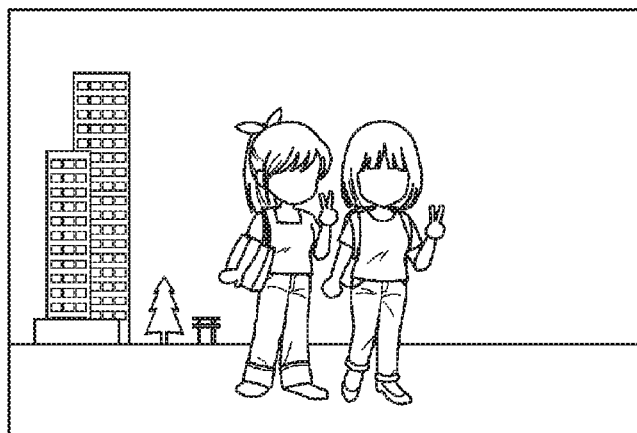
Next

INFORMATION PROCESSING SYSTEM, INFORMATION PROCESSING METHOD, MEDIUM, AND MANAGEMENT DEVICE

CROSS-REFERENCE TO RELATED APPLICATIONS

This application is based upon and claims the benefit of priority under 35 USC 119 of Japanese Patent Application No. 2019-157044, filed on Aug. 29, 2019, and Japanese Patent Application No. 2020-021841, filed on Feb. 12, 2020, the entire disclosure of which, including the description, claims, drawings, and abstract, is incorporated herein by reference in its entirety.

BACKGROUND

1. Field

The present invention relates to an information processing system, an information processing method, a medium, and a management device.

2. Related Art

Recently, identifiers such as two-dimensional barcodes displayed on screens have been widely used. As an example, there is a technique for reading a two-dimensional barcode to identify a communication destination. For example, Japanese Patent Application Laid-Open No. 2019-110602 discloses that two-dimensional barcodes respectively displayed on a first device and a second device are read by a third device to identify a communication destination between devices. This enables a communication connection between devices to be established without requiring each user to enter a communication destination manually. Further, for example, since the communication connection is thus established between devices, any one of devices can be used to control the other devices remotely.

SUMMARY

According to the first aspect of the present invention, there is provided an information processing system including: a presentation device configured to change identifiers periodically so as to present an identifier; a management device configured to share the identifier with the presentation device; and a communication device configured to acquire the identifier presented on the presentation device when an identifier acquisition operation by a user is detected, and to transmit, to the management device, (i) related information of the acquired identifier and (ii) an operation instruction to operate an information acquisition device identified by the acquired identifier, wherein the management device has a processor configured to identify the information acquisition device based on the related information of the identifier received from the communication device, and operate the identified information acquisition device based on the operation instruction received from the communication device.

According to the second aspect of the present invention, there is provided an information processing method performed by a system including a presentation device, a management device, and a communication device, including: causing the presentation device to change identifiers periodically so as to present an identifier; causing the presentation device and the management device to share the identifier presented on the presentation device with each other; causing the communication device to acquire the identifier presented on the presentation device when an identifier acquisition operation by a user is detected, and transmitting, to the management device, (i) related information of the acquired identifier and (ii) an operation instruction to operate an information acquisition device identified by the acquired identifier; and causing the management device to identify the information acquisition device based on the related information of the identifier received from the communication device, and to operate the identified information acquisition device based on the operation instruction received from the communication device.

According to the third aspect of the present invention, there is provided a non-transitory computer-readable recording medium with a program stored therein, the program causing a computer of a management device connected to a presentation device and a communication device to execute: sharing an identifier periodically changed by and presented on the presentation device; receiving, from the communication device, (i) related information of the acquired identifier and (ii) an operation instruction to operate an information acquisition device identified by the acquired identifier; identifying the information acquisition device based on the relate information of the identifier of received from the communication device; and operating the identified information acquisition device based on the operation instruction received from the communication device.

According to the fourth aspect of the present invention, there is provided a management device connected to a presentation device and a communication device, and including a processor, the processor of the management device executing: sharing an identifier periodically changed by and presented on the presentation device; receiving, from the communication device that acquires the identifier presented on the presentation device, (i) related information of the acquired identifier and (ii) an operation instruction to operate an information acquisition device identified by the acquired identifier; identifying the based on the related information of the identifier received from the communication device; and operating the identified information acquisition device based on the operation instruction received from the communication device.

BRIEF DESCRIPTION OF THE DRAWINGS

FIG. 22 is a schematic diagram illustrating an example of a status list and a waiting state list in the management server 1.

FIG. 23 is a part of a flowchart for describing a flow of identifier display stop processing and camera adjustment processing of the display device 2 performed by the management server 1.

FIG. 24 is a part of a flowchart for describing a flow of identifier display resume processing of the display device 2 performed by the management server 1.

FIG. 25 is a schematic diagram illustrating an example of a page displayed on the user terminal 4.

FIG. 28 is a schematic diagram illustrating an example of a list image of captured photos displayed on the user terminal 4.

DETAILED DESCRIPTION OF THE INVENTION

An embodiment of the present invention will be described below with reference to the accompanying drawings.

[Overall System Configuration]

Figure 1:
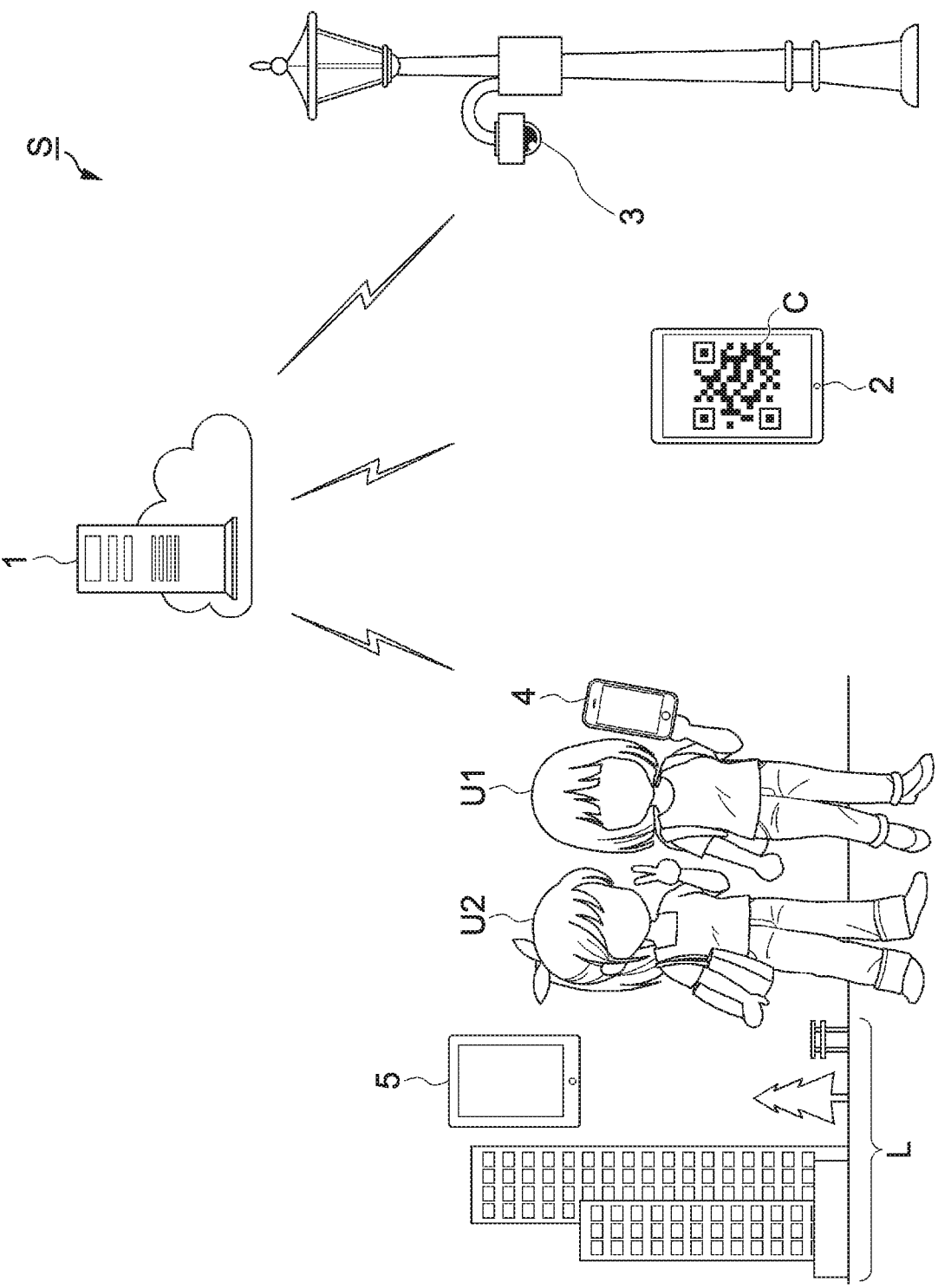
FIG. 1 is a system configuration diagram illustrating the configuration of a shooting system S according to one embodiment of the present invention.

FIG. 1 is a system configuration diagram illustrating the configuration of a shooting system S according to one embodiment of the present invention.

As illustrated in FIG. 1, the shooting system S is configured to include a management server 1, a display device 2, a camera 3, a user terminal 4, and an external device 5. The management server (management device) 1, the display device 2 (presentation device), the camera 3 (information acquisition device), and the user terminal 4 (communication device) are communicable with one another. This communication may be communication compliant with any standard. For example, this communication is realized by any one of the Internet, a LAN (Local Area Network), and a mobile phone network, or a network obtained by combining these networks.

The management server 1 is a device having an arithmetic processing function and a communication function. For example, the management server 1 is realized by an electronic device such as a server or a personal computer. Then, for example, the management server 1 operates as a "management device" of the present invention.

The display device 2 is a device having an image display function and a communication function. For example, the display device 2 is realized by a tablet type terminal, a digital signage, or an E-Ink display capable of electrically rewriting the display content. Then, for example, the display device 2 operates as a "presentation device" of the present invention. Further, the display device 2 displays an identifier such as a two-dimensional barcode. For example, an identifier such as a QR code (registered trademark) is displayed as indicated by a two-dimensional barcode C in FIG. 1.

The camera 3 is a photographing device having a photographing function and a communication function. For example, the camera 3 is realized by an electronic device such as a digital camera. Then, for example, the camera 3 operates as an "information acquisition device" of the present invention. Here, the display device 2 and the camera 3 are installed in association with a location suitable for commemorative photos such as a shooting spot at which user U1 and user U2 can take and record photos with a composition against a landscape L including buildings and a tree.

The user terminal 4 is a device having an arithmetic processing function, a communication function, and an identifier reading function. For example, the user terminal 4 is realized by a smartphone capable of being carried by a user, a wearable device such as a smart watch, or a digital camera. Then, for example, the user terminal 4 operates as a "communication device" of the present invention. As an example, FIG. 1 illustrates a state where user U1 of user U1 and user U2 is carrying and using the user terminal 4.

An external device 5 is a device having an arithmetic processing function, a communication function, and an identifier reading function. For example, the external device 5 is realized by a tablet, a desktop computer, or the like. For example, the external device 5 operates as an "external device" of the present invention. As an example, a tablet type external device 5 located in a remote place from the shooting system S is illustrated in FIG. 1. The configuration of the external device 5 in the embodiment is the same as that of the user terminal 4.

Although one pair of the display device 2 and the camera 3, and one user terminal 4 are illustrated in FIG. 1, it is assumed that multiple devices and terminals actually exist, respectively.

The shooting system S having this configuration performs "shooting management processing." Here, the shooting management processing is a series of processing performed by a user to manage shooting and recording using the camera 3.

Figure 2:
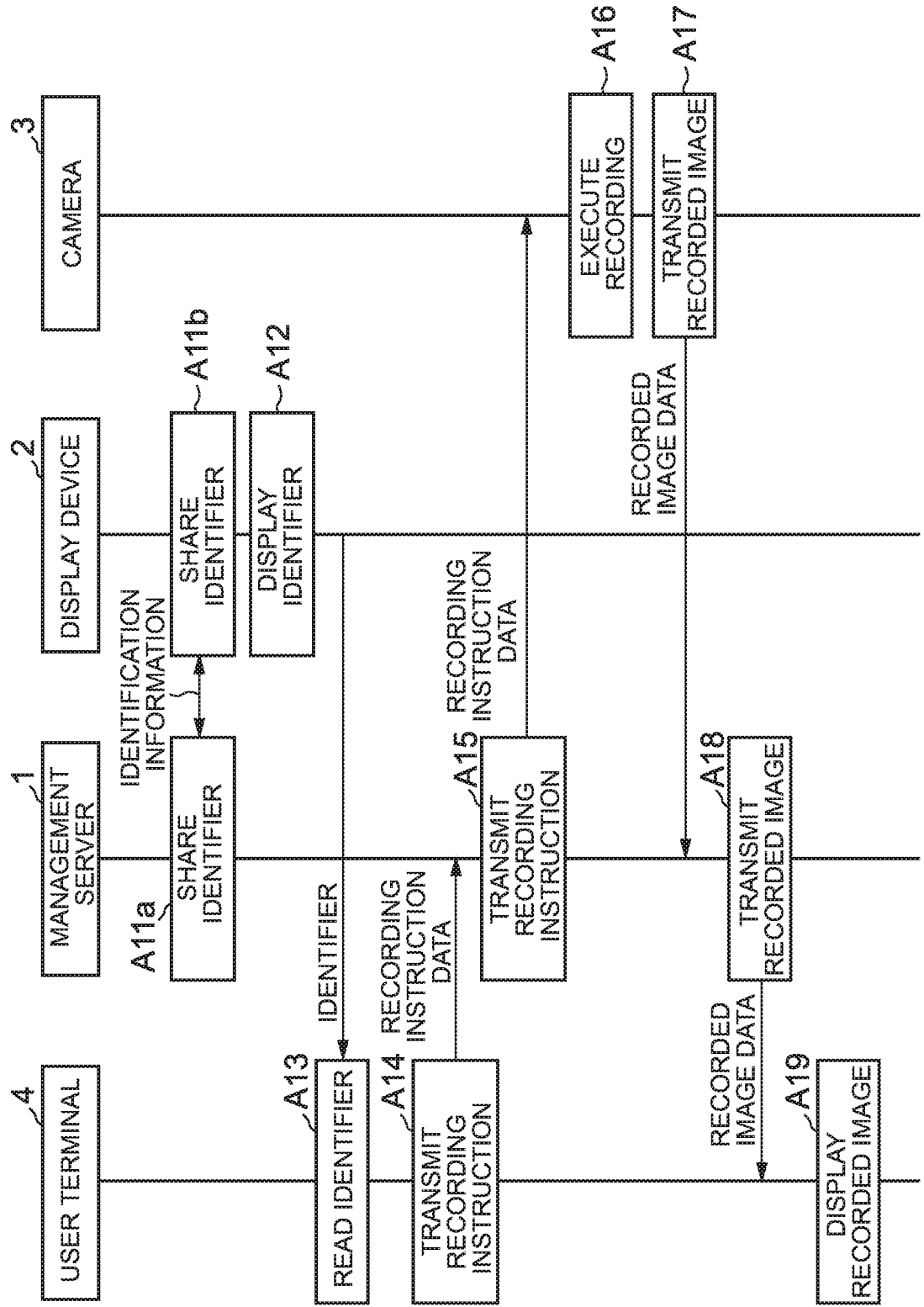
FIG. 2 is a sequence diagram illustrating an outline of the operation of the shooting system S according to one embodiment of the present invention.

An outline of this shooting management processing and information transmitted and received in the shooting management processing will be described with reference to FIG. 2. FIG. 2 is a sequence diagram illustrating the outline of the shooting management processing.

First, the management server 1 and the display device 2 communicate with each other to share an identifier (step A11a, step A11b). Further, the display device 2 displays the shared identifier, for example, like the two-dimensional barcode C illustrated in FIG. 1 (step A12). The identifier displayed on this display device 2 is the identifier presented to the user, which functions, for example, as a "presented identifier." Here, identifiers are changed periodically to share and display each identifier in the shooting management processing. Note that such periodic identifier changes are omitted in FIG. 2 in order to briefly describe the outline of the overall shooting management processing. Note that the periodic identifier changes are not limited to meaning that the same identifier is periodically presented. The periodic change here indicates that an identifier is changed to another identifier over time. In other words, it is indicated that an identifier presented at first time and an identifier presented at second time later than the first time are different from each other.

In each of identifiers changed periodically, unique connection information generated for each identifier is included. As an example, it is assumed in the following that this connection information is a unique URL (Uniform Resource Locator) generated for each identifier. Added to this URL is information for identifying the installation location of the display device 2 with the identifier displayed thereon (and the location of the camera 3 paired with this display device 2).

The user terminal 4 reads the identifier displayed on the display device 2 to acquire the information included in the identifier (step A13). The identifier read by this user terminal 4 is the identifier acquired by the user terminal 4, which functions, for example, as an "acquired identifier."

Based on the URL included in the read identifier, the user terminal 4 establishes a communication connection to a site provided on the management server 1, and transmits recording instruction data (step A14).

As described above, the information for identifying the installation location of the display device 2 (and the location of the camera 3 paired with this display device 2) is added to this URL. Then, based on the information added to the URL used by the user terminal 4, the management server 1 can identify a corresponding camera 3 as a target of this recording instruction.

Along with this communication connection, for example, the management server 1 also creates a user ID for identifying the name of a user (the user name of user U1 in FIG. 1) of the user terminal 4 to which the communication connection is established by using this URL and causes the user terminal 4 to store the user ID. For example, the management server 1 stores the user ID in a connection management area of browser software of the user terminal 4 in the form of a cookie. After that, the management server 1 can identify the user terminal 4 by transmitting and receiving this cookie to and from the user terminal 4.

The management server 1 transmits the received recording instruction data to the identified camera 3 (step A15).

Based on the received recording instruction data, the camera 3 executes recording of a shot image (step A16).

The camera 3 transmits, to the management server 1, recorded image data obtained based on the received recording instruction data (step A17). Then, the management server 1 stores and manages the recorded image data received from the camera 3 in association with the user ID of the user terminal 4 from which the recording instruction data was transmitted.

Hereinafter, the management server 1 manages the recorded image data associated with the user ID in a state of being browseable on the user terminal 4 owned by the user corresponding to this user ID. This browseable state includes, for example, a state where a recorded image based on the recorded image data is displayed on the user terminal 4 through a browser, and a state where the recorded image data is downloaded to the user terminal 4 and a recorded image based on this recorded image data is displayed. Note that the user terminal 4 in this case is not limited to the user terminal from which the recording instruction data was transmitted, and the user terminal 4 may be different from the user terminal which transmitted the recording instruction data as long as the user terminal is identified by the user ID.

The management server 1 transmits recorded image data to the user terminal 4 to display, on the user terminal 4, a recorded image based on the recorded image data (step A18).

The user terminal 4 displays the recorded image based on the recorded image data received from the management server 1 (step A19). As described above, the transmission and display of this recorded image may be realized either by displaying the recorded image through the browser or by downloading the recorded image data to the user terminal 4 to display the recorded image.

As described above, according to the shooting management processing, the user ID used as a cookie upon communication connection through the identifier can be used as information for identifying both the camera 3 and the user terminal 4.

Therefore, the user can remotely control the camera 3 corresponding to the identifier by reading this identifier once into the user terminal 4 to establish the communication connection to the management server 1.

[Hardware Configuration]

Next, the hardware configuration of each device included in the shooting system S will be described with reference to FIG. 3, FIG. 4, FIG. 5, and FIG. 6, respectively.

Figure 3:
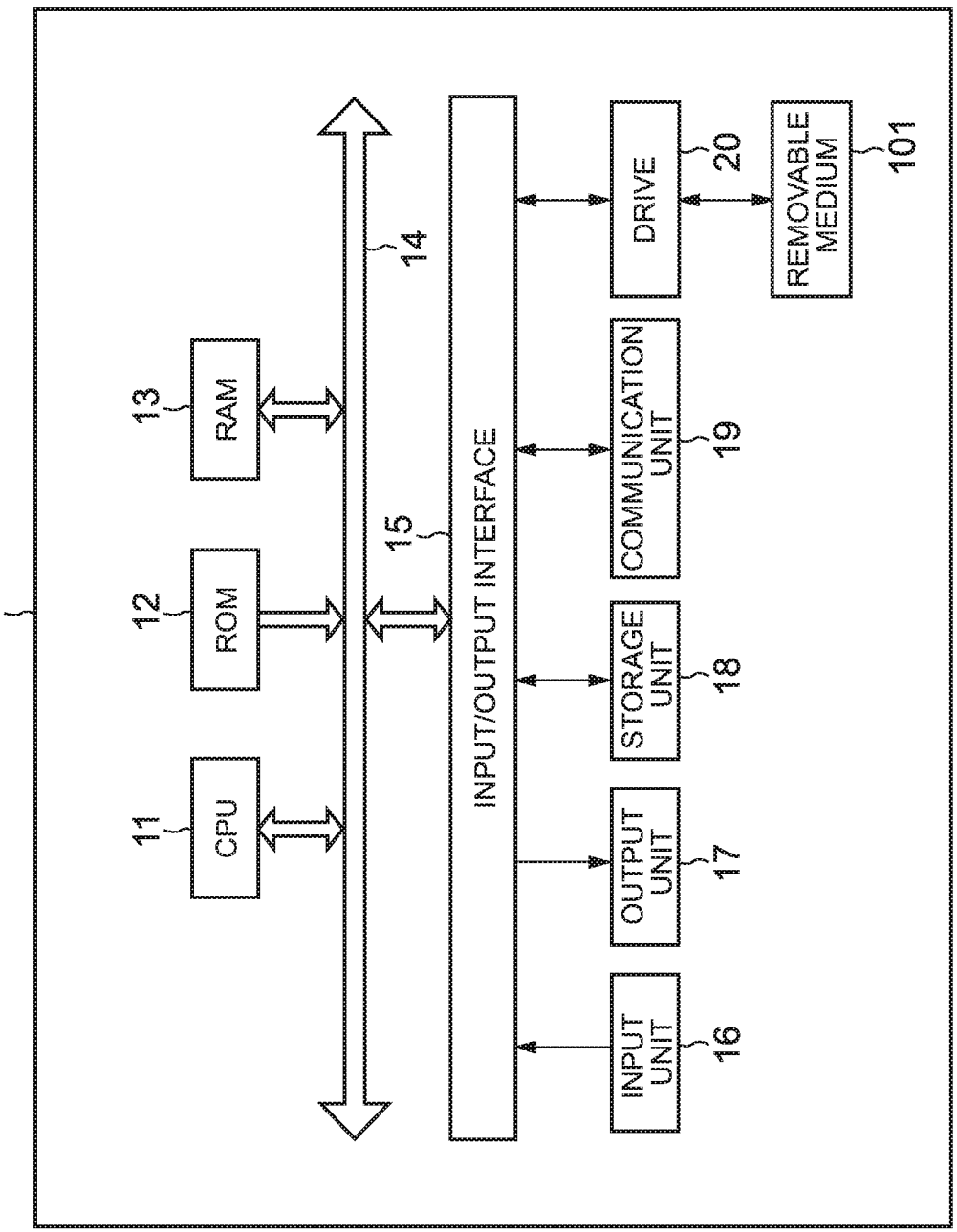
FIG. 3 is a block diagram illustrating the hardware configuration of a management server 1 included in the shooting system S according to one embodiment of the present invention.

FIG. 3 is a block diagram illustrating the hardware configuration of the management server 1 according to one embodiment of the shooting system of the present invention.

As illustrated in FIG. 3, the management server 1 includes a CPU (Central Processing Unit) 11, a ROM (Read Only Memory) 12, a RAM (Random Access Memory) 13, a bus 14, an input/output interface 15, an input unit 16, an output unit 17, a storage unit 18, a communication unit 19, and a drive 20.

The CPU 11 is a processor which executes various processing according to programs recorded in the ROM 12 or programs loaded from the storage unit 18 into the RAM 13. These programs are programs such as an operating system and firmware which operate each unit of the management server 1, or application software which implements functional blocks to be described later.

In the RAM 13, data necessary for the CPU 11 to execute various processing and the like are also stored as appropriate.

The CPU 11, the ROM 12, and the RAM 13 are connected to one another through the bus 14. The input/output interface 15 is also connected to this bus 14. The input unit 16, the output unit 17, the storage unit 18, the communication unit 19, and the drive 20 are connected to the input/output interface 15.

The input unit 16 is composed of various buttons and the like to accept user's instruction operations and input various pieces of information according to the accepted instruction operations.

The output unit 17 is composed of a display, a speaker, and the like to output images and sound. Note that the input unit 16 and the output unit 17 may be integrated together, for example, by a touch panel.

The storage unit 18 is configured by a hard disk, a DRAM (Dynamic Random Access Memory), or the like to store various image data.

The communication unit 19 controls communication performed with any other device. For example, as described above with reference to FIG. 1, the communication unit 19 controls communication performed between respective devices included in the shooting system S.

A removable medium 101 such as a magnetic disk, an optical disk, or a magneto-optical disk, or a semiconductor memory is mounted onto the drive 20 as appropriate. A program read by the drive 20 from the removable medium 101 is installed in the storage unit 18 as necessary. Further, the removable medium 101 can also store various data such as image data stored in the storage unit 18 in the same manner as the storage unit 18.

Figure 4:
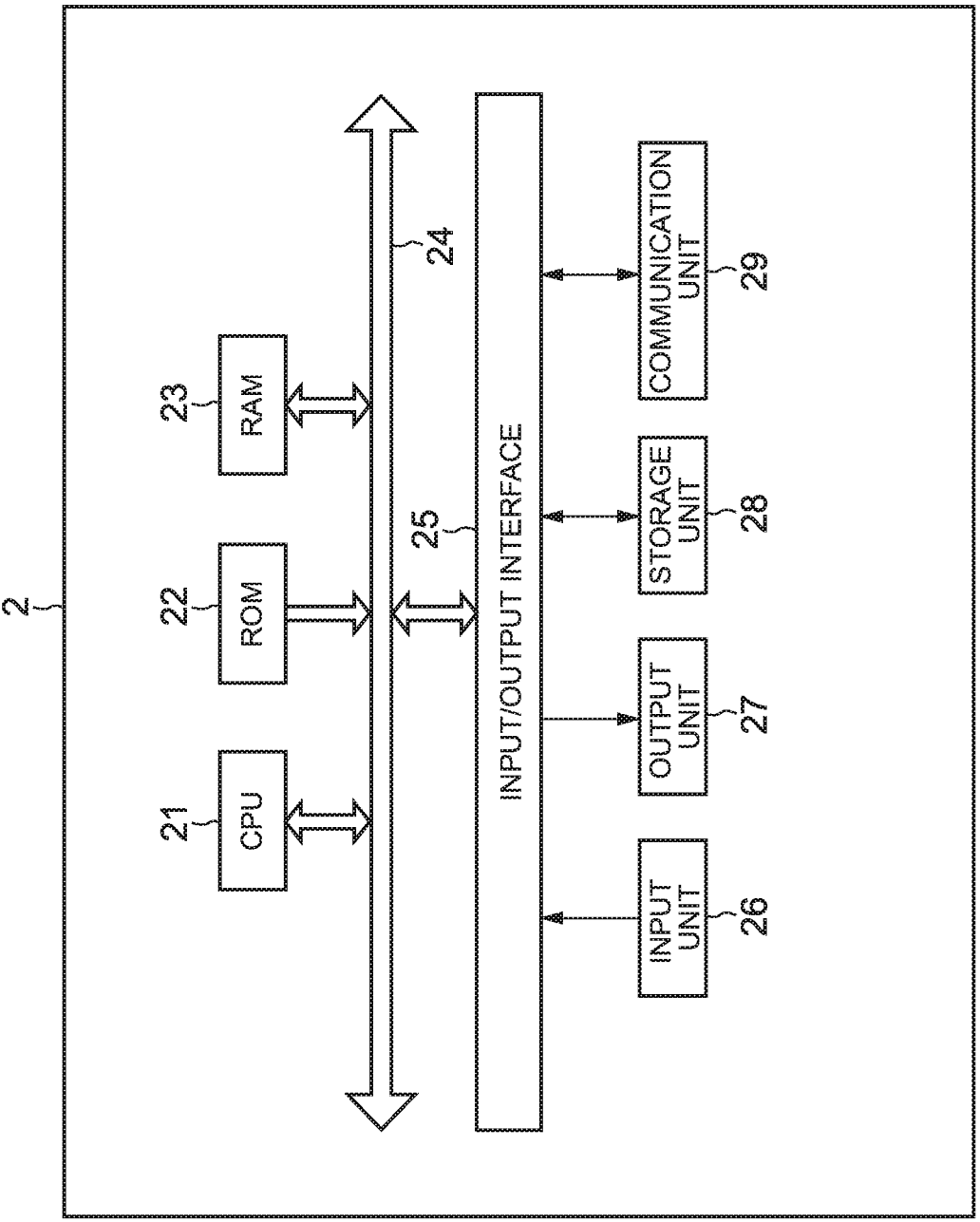
FIG. 4 is a block diagram illustrating the hardware configuration of a display device 2 included in the shooting system S according to one embodiment of the present invention.

FIG. 4 is a block diagram illustrating the hardware configuration of the display device 2 according to one embodiment of the shooting system of the present invention.

As illustrated in FIG. 4, the display device 2 includes a CPU 21, a ROM 22, a RAM 23, a bus 24, an input/output interface 25, an input unit 26, an output unit 27, a storage unit 28, and a communication unit 29.

Here, the hardware function of each unit having the same name but different only in the reference numeral is equivalent to the hardware function of each unit included in the above-described management server 1. Therefore, redundant description will be omitted below.

Figure 5:
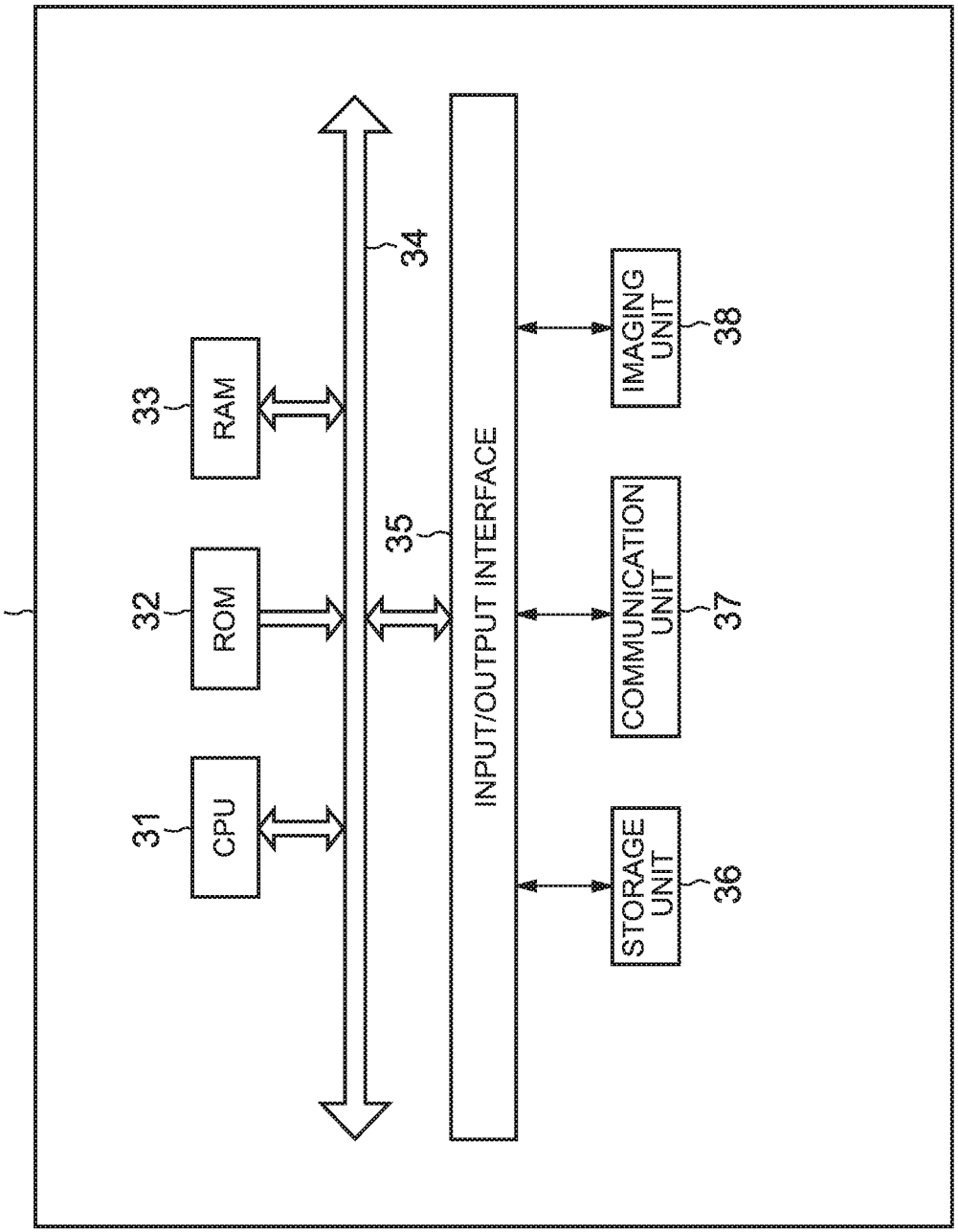
FIG. 5 is a block diagram illustrating the hardware configuration of a camera 3 included in the shooting system S according to one embodiment of the present invention.

FIG. 5 is a block diagram illustrating the hardware configuration of the camera 3 according to one embodiment of the shooting system of the present invention.

As illustrated in FIG. 5, the camera 3 includes a CPU 31, a ROM 32, a RAM 33, a bus 34, an input/output interface 35, a storage unit 36, a communication unit 37, and an imaging unit 38.

Though not illustrated, the imaging unit 38 includes an optical lens unit and an image sensor. The optical lens unit is composed of lenses that collect light such as a focus lens and a zoom lens to shoot a subject.

The focus lens is a lens to form a subject image on a light-receiving surface of the image sensor. The zoom lens is a lens to change the focal length freely within a certain range.

A peripheral circuit for adjusting setting parameters such as focal point, exposure, and white balance as necessary is also provided in the optical lens unit. The image sensor is composed of a photoelectric conversion element, an AFE (Analog Front End), and the like.

The photoelectric conversion element is, for example, a CMOS (Complementary Metal Oxide Semiconductor) type photoelectric conversion element or the like. The subject image is incident on the photoelectric conversion element from the optical lens unit. Then, the photoelectric conversion element photoelectrically converts (shoots) the subject image, accumulates an image signal for a certain time, and supplies, as an analog signal, the accumulated image signal sequentially to the AFE.

The AFE executes various signal processing such as A/D (Analog/Digital) conversion processing on this analog image signal. A digital signal is generated by the various signal processing, and output as an output signal of the imaging unit 38.

The hardware function of each of units other than the imaging unit 38, which has the same name but is different only in the reference numeral, is equivalent to the hardware function of each unit included in the above-described management server 1 or the display device 2. Therefore, redundant description will be omitted below.

Figure 6:
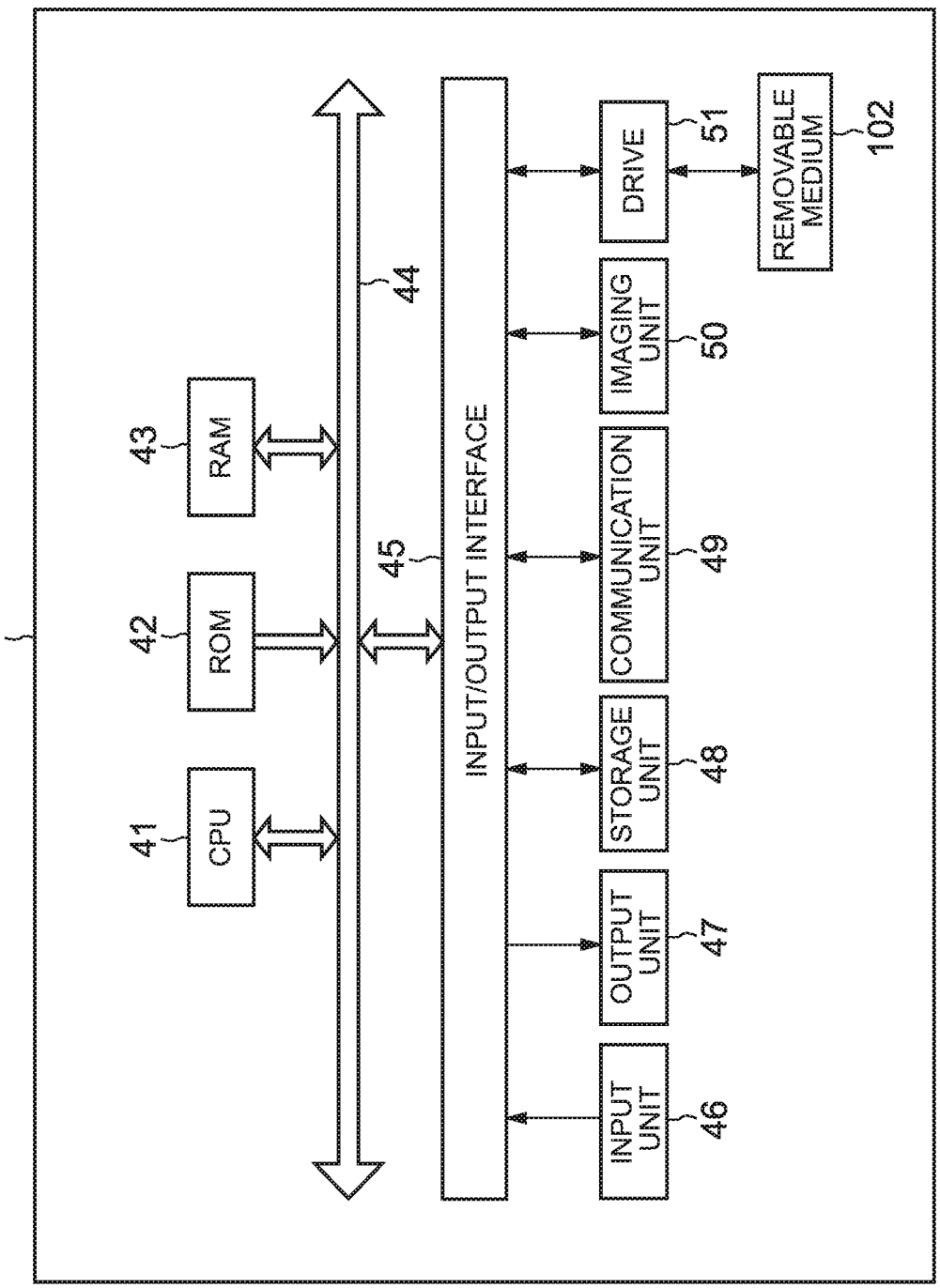
FIG. 6 is a block diagram illustrating the hardware configuration of a user terminal 4 included in the shooting system S according to one embodiment of the present invention.

FIG. 6 is a block diagram illustrating the hardware configuration of the user terminal 4 according to one embodiment of the shooting system of the present invention.

As illustrated in FIG. 6, the user terminal 4 includes a CPU 41, a ROM 42, a RAM 43, a bus 44, an input/output interface 45, an input unit 46, an output unit 47, a storage unit 48, a communication unit 49, an imaging unit 50, and a drive 51.

Here, the hardware functions of each unit and a removable medium 102 having the same name but different only in reference numeral are equivalent to the hardware functions of each unit and the removable medium included in the management server 1, the display device 2, and the camera 3 described above. Therefore, redundant description will be omitted below.

[Functional Blocks]

Next, functional blocks of each device included in the shooting system S will be described with reference to FIG. 7, FIG. 8, FIG. 9, FIG. 10, and FIG. 11.

Figure 7:
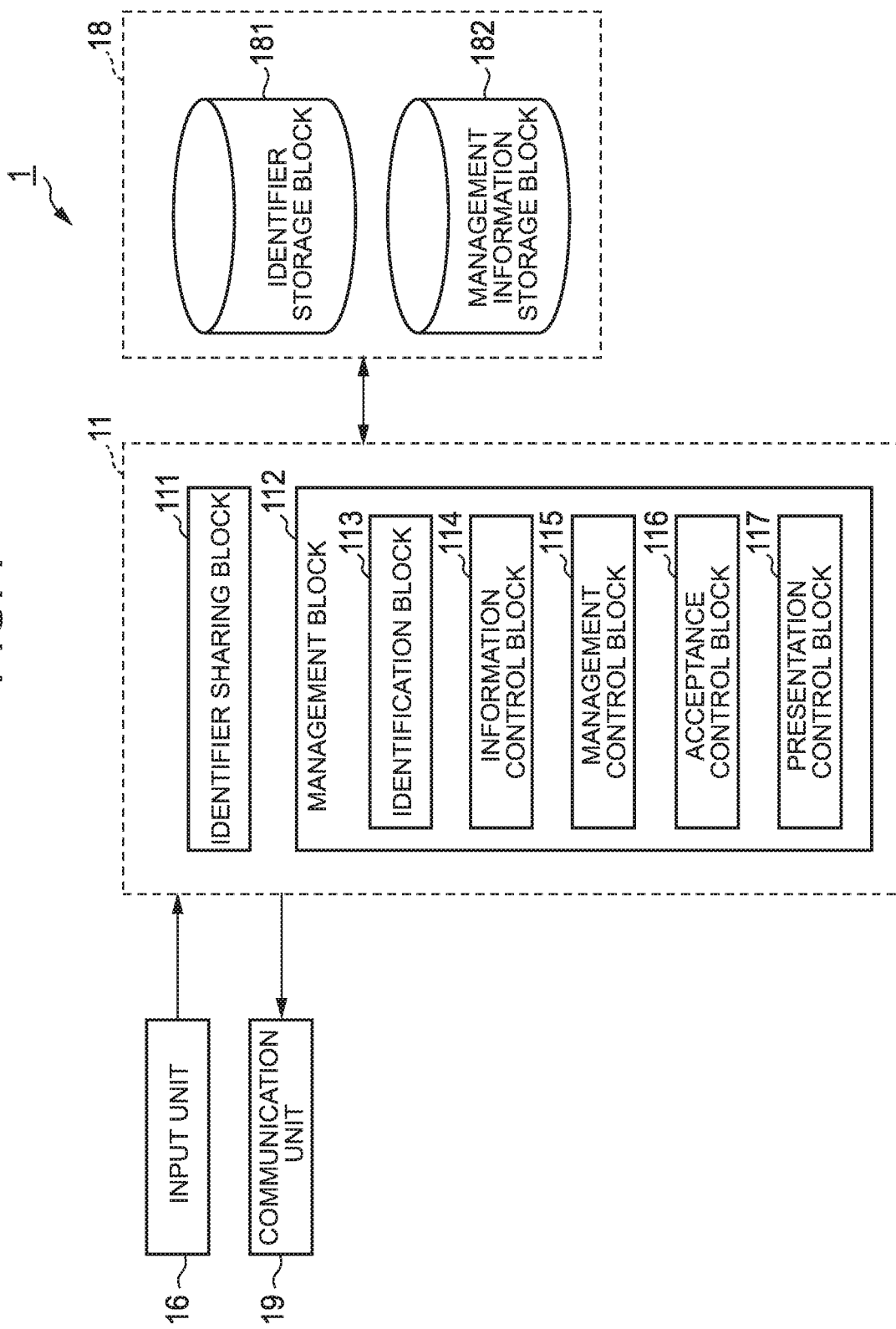
FIG. 7 is a functional block diagram illustrating a functional configuration for executing shooting management processing in the functional configuration of the management server 1.

FIG. 7 is a functional block diagram illustrating a functional configuration for executing shooting management processing in the functional configuration of the management server 1 in FIG. 3.

Here, the shooting management processing is a series of processing performed to manage shooting by a user using the camera 3 as described above.

As illustrated in FIG. 7, an identifier sharing block 111 and a management block 112 in the CPU 11 function to execute the shooting management processing.

Further, when the shooting management processing is executed, an identifier storage block 181 and a management information storage block 182 are set in one area of the storage unit 18.

Though it may not be specifically mentioned below, data necessary to realize the shooting management processing is transmitted and received between these functional blocks appropriately in a timely manner.

In the identifier storage block 181, an identifier (for example, a two-dimensional barcode) shared with the display device 2 is stored. As described above, the identifier is changed periodically. Further, as also described above, the identifier includes a URL, and information of the installation location corresponding to the display device 2 with the identifier displayed thereon (and the installation location corresponding to the camera 3 paired with this display device 2) is added to the identifier.

A code ID as a unique ID is also added to the identifier. The code ID is used by the management block 112 to be described later to identify the order of displaying the identifier. As the code ID, for example, a number monotonically increasing each time the identifier is changed, or information capable of identifying the display order such as a timestamp is used. In addition, for example, a random number such as a UUID (Universally Unique Identifier) may be used as the code ID in such a manner that the management block 112 stores this random number and the order of displaying the identifier to identify the display order.

The identifier stored in the identifier storage block 181 is updated appropriately by the identifier sharing block 111.

In the management information storage block 182, "management information" as information used by the management block 112 to perform management in the shooting management processing is stored. A specific content of the management information will be described later in the description of the management block 112.

The identifier stored in the management information storage block 182 is updated appropriately by the management block 112.

The identifier sharing block 111 shares the identifier changed periodically with the display device 2 by the communication through the communication unit 19. The information such as the URL included in the identifier periodically changed is newly generated by the management block 112 for each period. The identifier sharing block 111 converts, to an identifier, the information such as the new URL generated by the management block 112. Then, the identifier sharing block 111 transmits this identifier to the display device 2 so that the display device 2 can share the identifier. Note that the length of each changing period can be arbitrarily set. For example, the length of each period can be set in tens of seconds (for example, every 30 seconds). The identifier sharing block 111 also update the identifier stored in the identifier storage block 181 each time the identifier is updated.

The management block 112 updates the management information stored in the management information storage block 182, and performs management in the shooting management processing based on this management information. In the following, description will be made by dividing the management block 112 into plural functional blocks. The management block 112 of the embodiment includes an identification block 113, an information control block 114, a management control block 115, an acceptance control block 116, and a presentation control block 117.

The identification block 113 identifies the camera 3 based on the identifier. For example, as described above, since the display device 2 and the camera 3 are associated with each other as a pair, the identification block 113 acquires the identifier to identify the display device 2 sharing the identifier. Then, the identification block 113 identifies the camera 3 associated with the identified display device 2 as a target of the recording instruction.

The information control block 114 controls the installation location of the camera 3, the code ID included in the identifier, the user ID of the user terminal 4 which establishes the communication connection to the management server 1 to transmit the recording instruction data, and recorded image data acquired with the camera 3 in association with one another. For example, the management block 112 stores the above-described pieces of information in a table 1821 of the management information storage block 182 in association with one another.

Further, the information control block 114 generates an URL included in each identifier and information to be added to the URL. Based on the URL generated by the information control block 114, the identification block 113 performs processing for identifying the user terminal 4 which established the communication connection and processing for identifying the camera 3 to which recording instruction data is transmitted.

The management control block 115 performs processing for managing recorded image data obtained by the recording instruction. For example, the management control block 115 performs processing for transmitting the recorded image data shot with the camera 3 to the user terminal 4 or the external device 5 in which the same user name as that of the user terminal 4 is set. In other words, the user can cause the external device 5 sharing the user ID to download the recorded image data. Further, the external device 5 may be specified in advance as a download destination of the recorded image data.

The acceptance control block 116 determines whether the recording instruction using the camera 3 is accepted or not based on a predetermined condition. For example, during accepting a recording instruction from the user to take a photo(s), the acceptance control block 116 performs control not to accept recording instructions from other user terminals 4.

The presentation control block 117 performs processing on information to be displayed on the display device 2. For example, the presentation control block 117 performs processing for transmitting the identifier to be displayed on the display device 2, processing for displaying information related to shooting, and the like.

Note that the processing performed by the identification block 113, the information control block 114, the management control block 115, the acceptance control block 116, and the presentation control block 117 may be described below as the processing of the management block 112.

Figure 8:
FIG. 8 is a table illustrating an example of a table 1821 as a data structure stored in a management information storage block 182 of the management server 1.

The details of the management information stored in the management information storage block 182 will be described with reference to FIG. 8. FIG. 8 is the table 1821 illustrating an example of the data structure of the management information stored in the management information storage block 182. As illustrated in FIG. 8, the table 1821 includes, as the management information, "installation location," "code ID," "user ID," and "recorded image data."

The installation location and the code ID are stored in the table 1821 as new records when the recording instruction from the user terminal 4 is newly accepted. As for the user ID, when a cookie is transmitted and received through communication with the user terminal 4, a user ID corresponding to this cookie is added to and stored in a corresponding record. Further, the recorded image data is added to and stored in a corresponding record when a shot is taken with the camera 3.

Note that the table 1821 may be updated (for example, the registration of the installation location, and the like) based on operations by an operator of the management server 1 accepted by the input unit 16.

The installation location is information indicative of the installation location of the display device 2 with the identifier displayed thereon (and the installation location of the camera 3 paired with this display device 2). For example, as illustrated in FIG. 8, the name of a spot at which the display device 2 (and the camera 3) is installed can be used as the installation location. In the embodiment, the display device 2 (and the camera 3 paired with this display device 2) is identified based on the information of this installation location, but the present invention is not limited thereto. For example, there is a case where two or more cameras 3 (for example, two or more cameras 3 having different shooting angles, respectively) exist at the same installation location.

In this case, each camera 3 may be identified by further using angle information in addition to the information of this installation location.

Alternatively, instead of the information of this installation location, a unique ID assigned to each display device 2 or a unique ID assigned to each camera 3 may be used. Then, the IDs respectively corresponding to the display device 2 and the camera 3 may be linked to each installation location to identify the display device 2 (and the camera 3 paired with this display device 2).

The code ID is a unique ID assigned to each identifier. The details of the code ID is as described above in the description of the identifier sharing block 111. For example, as illustrated in FIG. 8, a number monotonically increasing each time the identifier is changed can be used. As described above, the installation location and the code ID are information added to the URL.

The user ID is a unique ID for identifying each user terminal 4, respectively. For example, as illustrated in FIG. 8, a combination of numerals and alphabets or the like can be used. When the user terminal 4 establishes communication connection based on a URL corresponding to the identifier, a browser of the user terminal 4 stores the user ID as a cookie. Then, once the user terminal 4 stores any user ID as a cookie, this user terminal 4 continues to use this user ID even when establishing a communication connection based on any other URL. In other words, the user ID once stored as a cookie is not rewritten. Therefore, the user ID functions as a unique ID for identifying each user terminal 4, respectively.

The recorded image data is image data obtained as a result of shooting and recording with the camera 3. For example, as illustrated in FIG. 8, a file name of the recorded image data and image data itself as the file can be used. The data format of the recorded image data is not particularly limited, and any data format can be used according to the environment in which the shooting system S is implemented, and the like.

The management block 112 updates these pieces of management information stored in the management information storage block 182, and performs management in the shooting management processing based on this management information. Specifically, the management block 112 identifies the camera 3 as a target of the recording instruction (operation instruction) based on information added to the URL used by the user terminal 4 for communication connection. Further, after the communication connection is established, the management block 112 identifies the user terminal 4 which transmitted the recording instruction data (operation instruction data) based on the user ID transmitted to and received from the user terminal 4 as the cookie.

Further, based on the code ID added to the URL used for the communication connection, the management block 112 determines whether to accept the recording instruction data transmitted from the user terminal 4 which established the connection using this URL or not.

When the camera 3 accepts recording instruction data from any one of plural user terminals 4, the management block 112 does not accept recording instructions from the other user terminals 4 until processing based on this recording instruction data is ended. Then, after recorded image data is obtained, recording instruction data from any other user terminal 4 is accepted anew.

Note that recording instruction data from the user terminal 4 may be accepted several times until the predetermined condition is met. Further, recording instruction data from any other user terminal 4 may be accepted after the predetermined condition is met. For example, this predetermined condition is that the recording instruction data is accepted a predetermined number of times or that a preset time has passed. This enables the user of the user terminal 4 to transmit the recording instruction data over and over again even after transmitting the recording instruction data until the predetermined condition is met.

Further, when recording instruction data from any other user terminal 4 is newly accepted, the management block 112 accepts the recording instruction data of the user terminal 4, which first read the identifier and established communication connection, with priority over that of any other user terminal 4. Since code IDs can be used to identify the display order of identifiers, the management block 112 refers to the code IDs to figure out that identifiers have been cyclically displayed on the display device 2 in order of a first identifier, a second identifier, a third identifier, and so on.

The management block 112 accepts recording instruction data from a user terminal 4 that read the first identifier with priority. For example, when the recording instruction data from the user terminal 4 that read the first identifier is not accepted, the management block 112 does not accept recording instruction data from another user terminal 4 that read the second identifier until the prior recording instruction data is accepted within an effective period.

This enables the user terminal 4 that read the identifier earlier than the other user terminals 4 to transmit recording instruction data to the camera 3 with priority.

The management block 112 transmits the accepted recording instruction data to the camera 3 to cause the camera 3 to execute recording. Further, the management block 112 manages a recorded image based on recorded image data obtained by the recording instruction data in such a manner that the recorded image can be browsed on the user terminal 4 from which the recording instruction data was transmitted.

Here, an example of using a cookie to associate the user terminal 4 and the camera 3 with each other in the management server 1 will be described. The information control block 114 of the management server 1 issues a URL and generates, as an identifier, a two-dimensional barcode corresponding to the URL and information added to the URL. This two-dimensional barcode is displayed on the display device 2. The CPU 41 of the user terminal 4 uses the imaging unit 50 to shoot this two-dimensional barcode and convert the barcode part to the URL. Then, this converted URL is used to give the communication unit 49 a connection request to the management server 1.

When the connection request from the user terminal 4 is detected, the identification block 113 confirms a user ID transmitted from the user terminal 4 and determines whether it is an invalid access or not. When it is not the invalid access, the identification block 113 issues a cookie. Further, the identification block 113 stores, in the management information storage block 182, the user terminal 4, for which a user ID corresponding to the cookie is set, and the installation location of a camera 3, to which recording instruction data is transmitted among the installation locations of plural cameras 3, in association with each other. In this example of using the cookie, it is assumed that a "session ID" is embedded in the cookie and the management server 1 side adopts a "session management" method in which various pieces of information are stored in the management information storage block 182 in association with the session ID.

Figure 9:
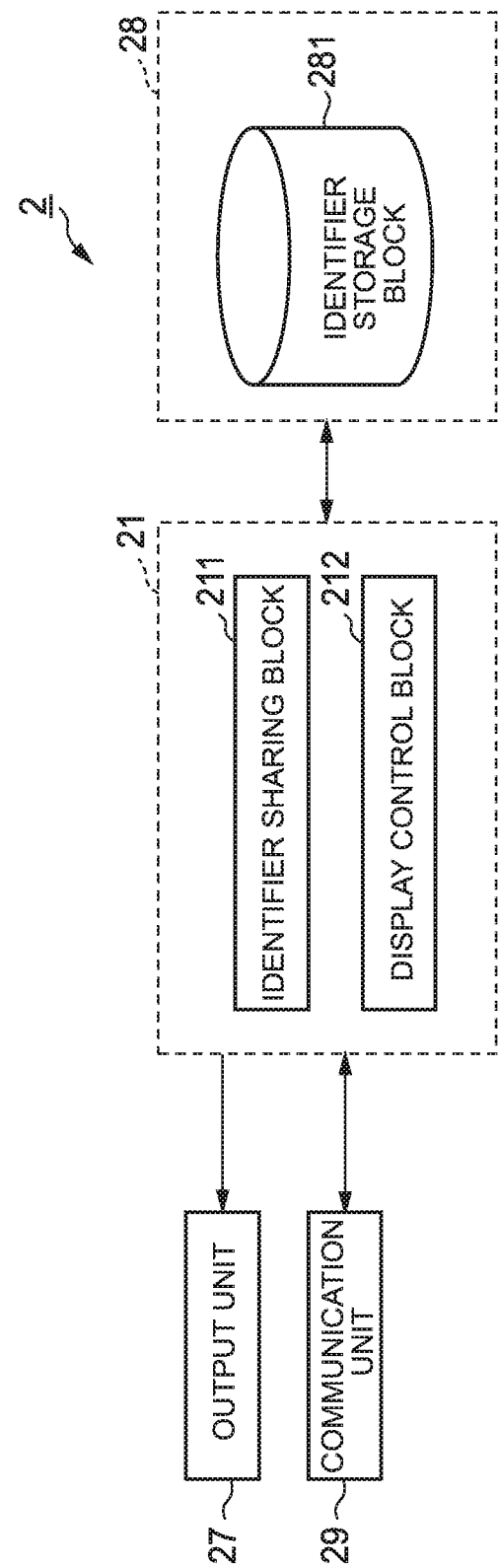
FIG. 9 is a functional block diagram illustrating a functional configuration for executing the shooting management processing in the functional configuration of the display device 2.

FIG. 9 is a functional block diagram illustrating a functional configuration for executing the shooting management processing in the functional configuration of the display device 2 of FIG. 4.

As illustrated in FIG. 9, an identifier sharing block 211 and a display control block 212 in the CPU 21 function to execute the shooting management processing.

Further, when the shooting management processing is executed, an identifier storage block 281 is set in one area of the storage unit 18.

Though it may not be specifically mentioned below, data necessary to realize the shooting management processing is transmitted and received between these functional blocks appropriately in a timely manner.

In the identifier storage block 281, an identifier shared with the management server 1 is stored. The identifier stored in the identifier storage block 281 is updated appropriately by the identifier sharing block 211.

The identifier sharing block 211 shares periodically changed identifiers with the management server 1 by the communication through the communication unit 29. Since the details of these identifiers and sharing of the identifiers are described above in the description of the management server 1, redundant description will be omitted here.

The display control block 212 performs control to cause the output unit 27 to display the identifier stored in the identifier storage block 281. As described above, the identifier is updated, for example, in a cycle of tens of seconds. Therefore, the display control block 212 updates and displays the latest identifier shared with the management server 1 in this cycle.

Figure 10:
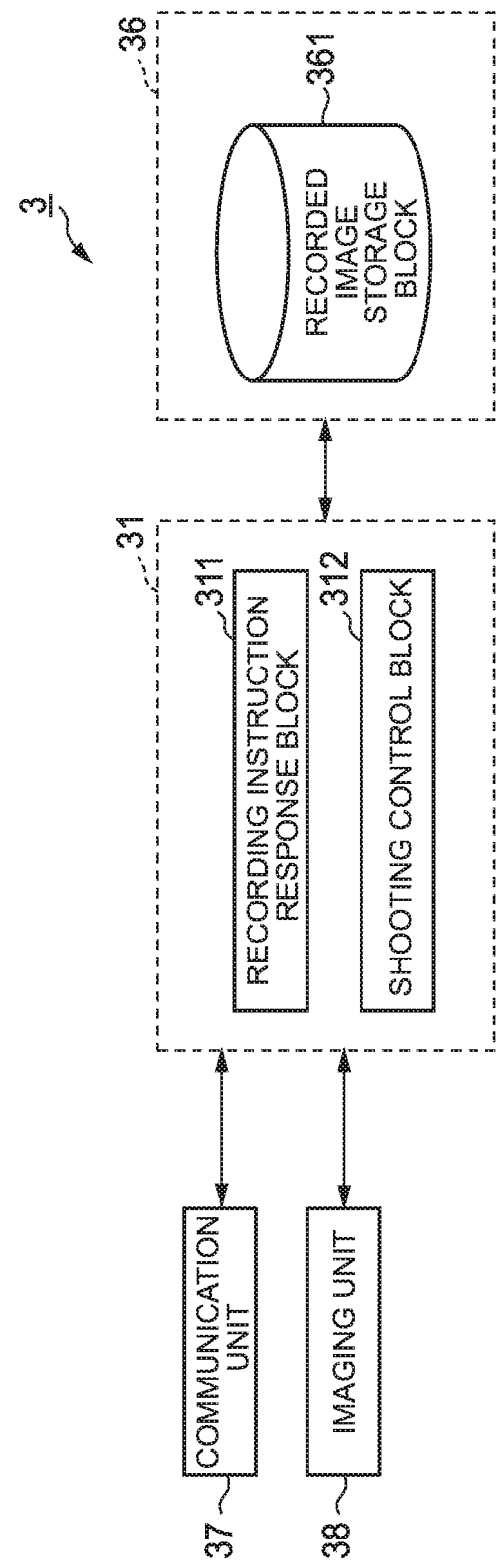
FIG. 10 is a functional block diagram illustrating a functional configuration for executing the shooting management processing in the functional configuration of the camera 3.

FIG. 10 is a functional block diagram illustrating a functional configuration for executing the shooting management processing in the functional configuration of the camera 3 of FIG. 5.

As illustrated in FIG. 10, a recording instruction response block 311 and a shooting control block 312 in the CPU 31 function to execute the shooting management processing. Further, when the shooting management processing is executed, a recorded image storage block 361 is set in one area of the storage unit 36.

Though it may not be specifically mentioned below, data necessary to realize the shooting management processing is transmitted and received between these functional blocks appropriately in a timely manner.

In the recorded image storage block 361, a recorded image as image data obtained by the imaging unit 38 taking a photo under the control of the shooting control block 312 is stored.

The recording instruction response block 311 accepts recording instruction data from the management server 1. This recording instruction data corresponding to the identifier displayed on the display device 2 paired with the camera 3 is transmitted from the user terminal 4. Upon accepting the recording instruction data, the recording instruction response block 311 instructs the shooting control block 312 to perform shooting and recording. Further, the recording instruction response block 311 transmits, to the management server 1, recorded image data obtained by the shooting control block 312 executing shooting and recording.

Based on the instruction from the recording instruction response block 311, the shooting control block 312 performs control to drive the imaging unit 38 so as to execute shooting and recording. Thus, image data desired by the user of the user terminal 4 (for example, an image including the user of the user terminal 4 as a subject image against a desired landmark) is obtained as recorded image data. The shooting control block 312 outputs this recorded image data to the recording instruction response block 311 and stores the recorded image data in the recorded image storage block 361.

Figure 11:
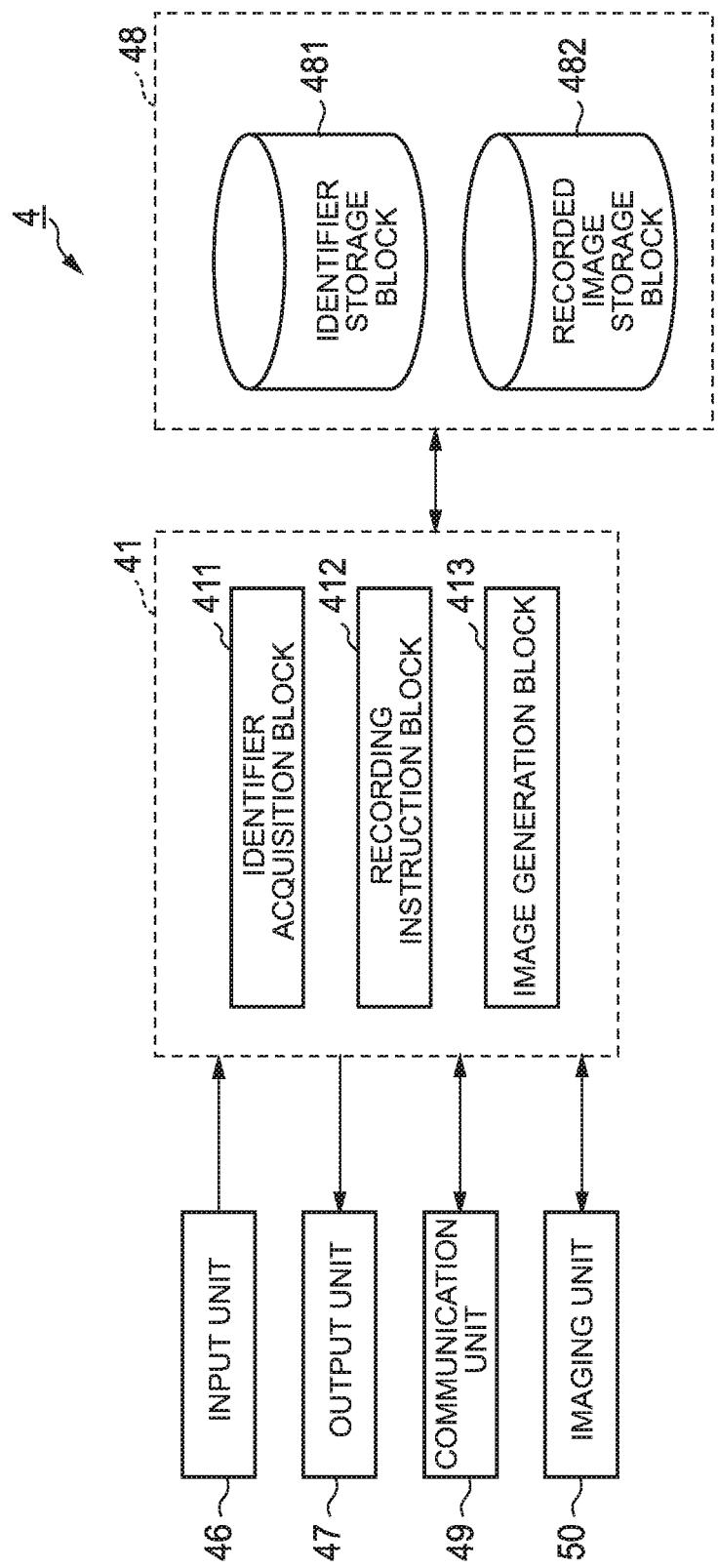
FIG. 11 is a functional block diagram illustrating a functional configuration for executing the shooting management processing in the functional configuration of the user terminal 4.

FIG. 11 is a functional block diagram illustrating a functional configuration for executing the shooting management processing in the functional configuration of the user terminal 4 of FIG. 6.

As illustrated in FIG. 11, an identifier acquisition block 411, a recording instruction block 412, and an image generation block 413 in the CPU 41 function to execute the shooting management processing.

Further, when the shooting management processing is executed, an identifier storage block 481 and a recorded image storage block 482 are set in one area of the storage unit 48.

Though it may not be specifically mentioned below, data necessary to realize the shooting management processing is transmitted and received among these functional blocks appropriately in a timely manner.

In the identifier storage block 481, information included in an identifier read by the identifier acquisition block 411 is stored. The information included in the identifier stored in the identifier storage block 481 is updated appropriately by the identifier acquisition block 411.

In the recorded image storage block 482, a recorded image shot with the camera 3 based on recording instruction of the recording instruction block 412 is stored.

The identifier acquisition block 411 reads an identifier such as a two-dimensional barcode displayed on the display device 2 based on an operation of the user of the user terminal 4 accepted by the input unit 46. This reading is realized by decoding a two-dimensional barcode, included in the image shot by the imaging unit 50, using a known algorithm (for example, an algorithm complying with the two-dimensional barcode standard). The identifier acquisition block 411 stores, in the identifier storage block 481, information included in the two-dimensional barcode.

The recording instruction block 412 transmits, to the management server 1, recording instruction data for the camera 3 based on an operation of the user of the user terminal 4 accepted by the input unit 46.

The image generation block 413 receives, from the management server 1, recorded image data shot based on the recording instruction data transmitted from the recording instruction block 412. Then, the image generation block 413 generates a recorded image based on the received recorded image data and displays the generated recorded image on the output unit 47.

The recording instruction block 412 and the image generation block 413 use a URL included in the identifier read by the identifier acquisition block 411 to establish communication connection to the management server 1 in order to transmit the recording instruction data and receive the recorded image data, respectively. Note that a browser may be automatically launched by taking the opportunity that the identifier acquisition block 411 has read the URL from the identifier.

[Operation]

Although the user terminal 4 is described above, the external device 5 has the same configuration. Next, the operation of each device included in the shooting system S will be described with reference to FIG. 12 to FIG. 25.

Figure 12:
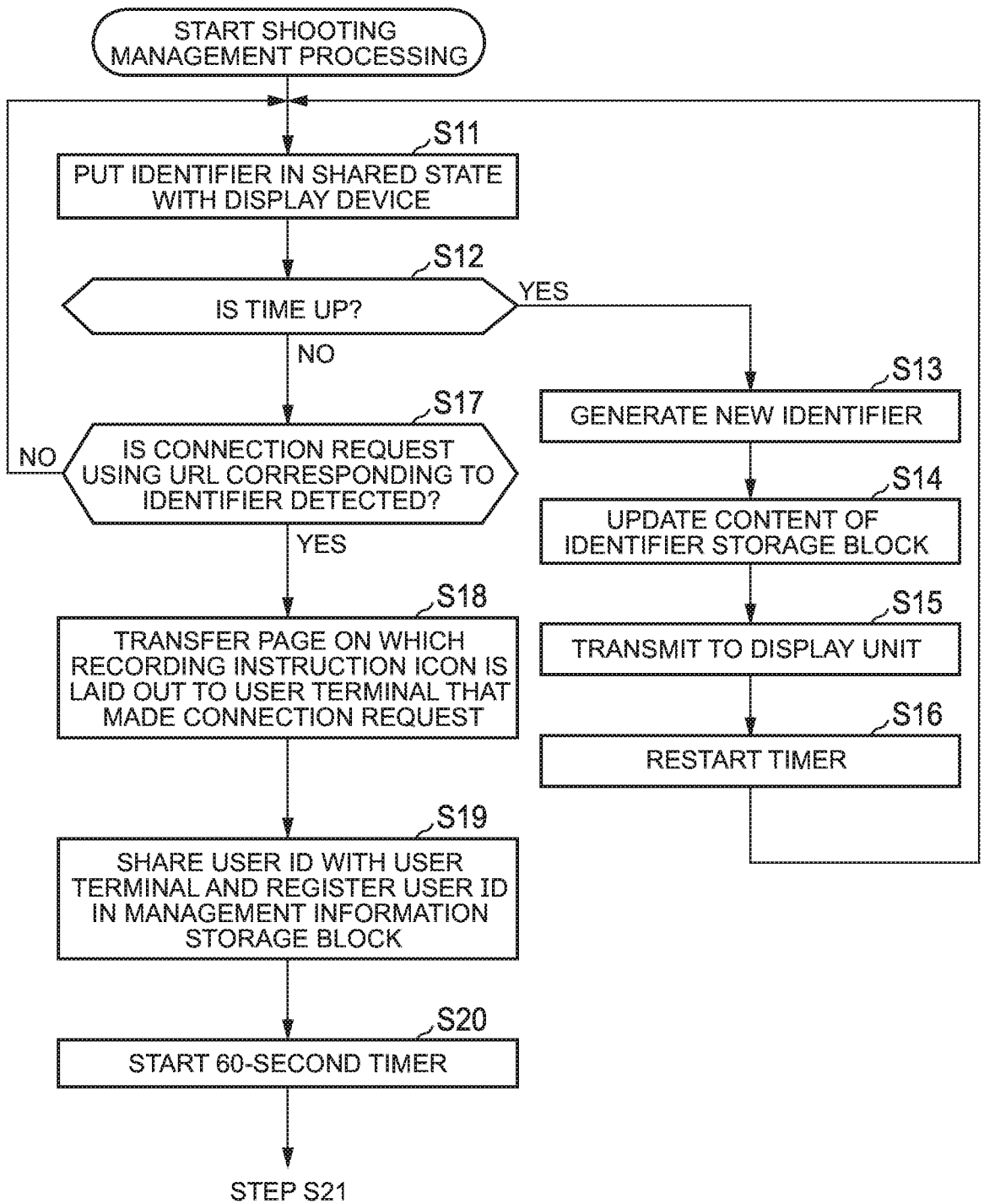
FIG. 12 is a part of a flowchart for describing a flow of the shooting management processing in the management server 1.
Figure 13:
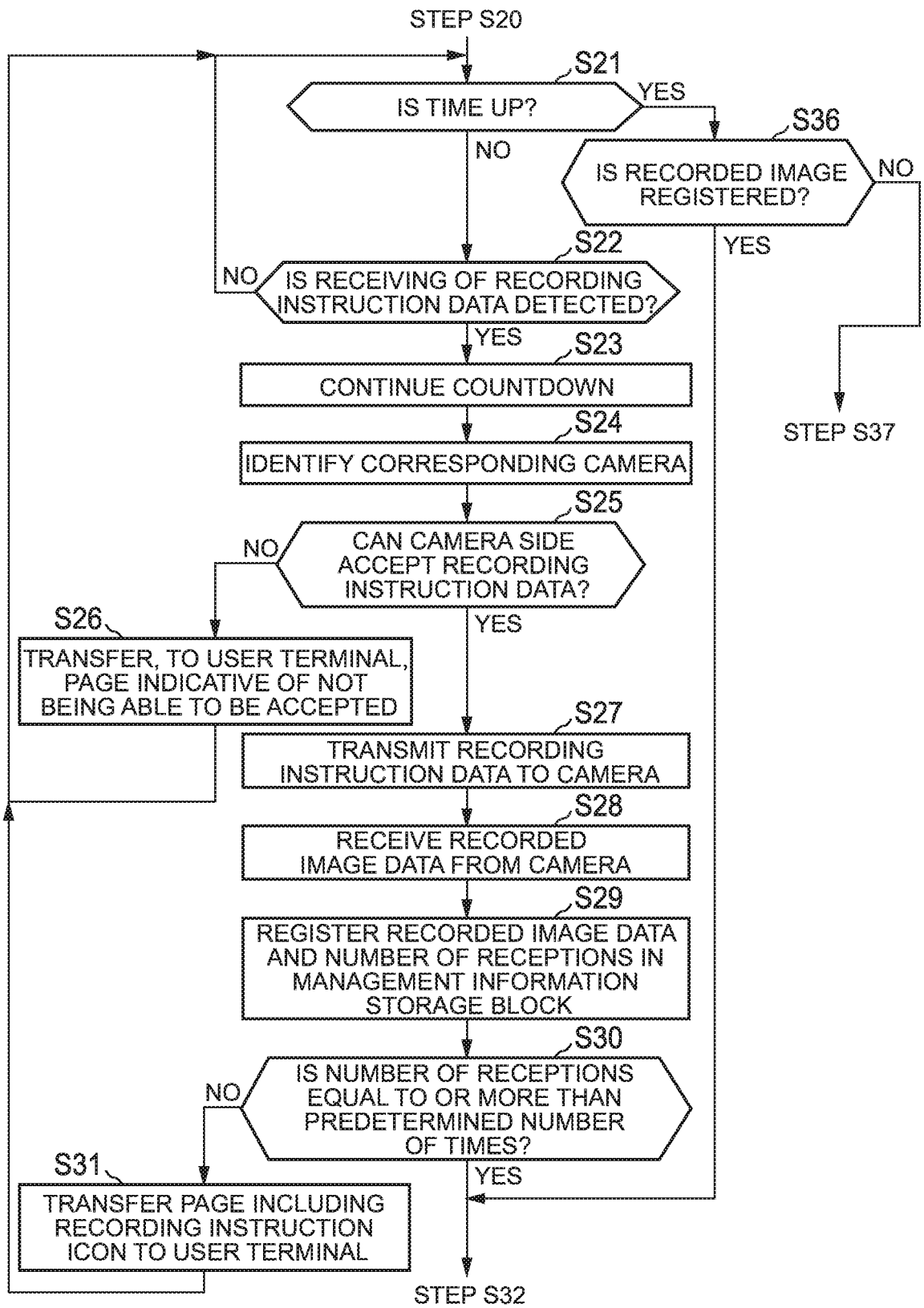
FIG. 13 is another part of the flowchart for describing the flow of the shooting management processing in the management server 1.
Figure 14:
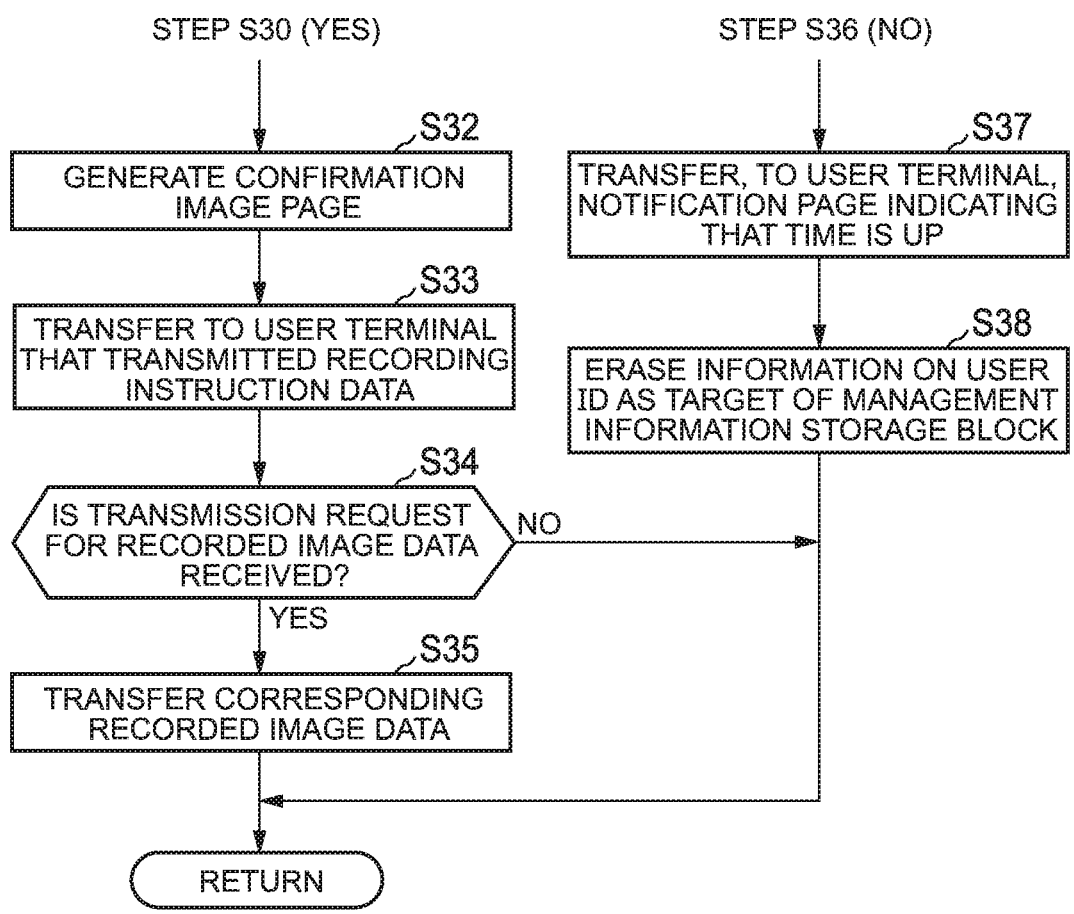
FIG. 14 is the remaining part of the flowchart for describing the flow of the shooting management processing in the management server 1.

FIG. 12, FIG. 13, and FIG. 14 are flowcharts for describing a flow of the shooting management processing executed by the management server 1 having the functional configuration of FIG. 7 in the shooting system S.

First, the identifier sharing block 111 executes processing for putting an identifier such as a two-dimensional barcode in a shared state with the display device 2 (step S11). For example, the identifier is put in the shared state with the display device 2 by transmitting, from the management server 1, the identifier to be shared with the display device 2.

Next, the identifier sharing block 111 determines whether time is up or not (step S12). Specifically, when a predetermined time (for example, 30 seconds) has passed after the start of the shooting management processing, the identifier sharing block 111 determines that time is up. "Time is up" means that the cycle to change the identifier has arrived. When the identifier sharing block 111 determines that the cycle to change the identifier has arrived (step S12→Yes), the procedure proceeds to step S13. On the other hand, when the identifier sharing block 111 determines that the cycle to change the identifier has not arrived yet (step S12→No), the procedure proceeds to step S17.

When the identifier sharing block 111 determines that the cycle to change the identifier has arrived, a new identifier is generated (step S13), and the generated identifier is written into the identifier storage block 181 to update the content of the identifier storage block 181 (step S14).

After that, the identifier sharing block 111 transmits the newly generated identifier to the display device 2 (step S15), and restart a timer (step S16). Then, the procedure returns to step S11 to share the newly generated identifier with the display device 2.

On the other hand, when the identifier sharing block 111 determines that the cycle to change the identifier has not arrived yet, the information control block 114 of the management block 112 determines whether a connection request using a URL corresponding to the identifier from the user terminal 4 is detected or not (step S17). When the information control block 114 determines that the connection request is detected (step S17→Yes), the procedure proceeds to step S18. On the other hand, when the information control block 114 determines that the connection request is not detected (step S17→No), the procedure returns to step S11.

When the information control block 114 determines that the connection request is detected, recording instruction data is transmitted to the camera 3 through the management server 1, and a page on which a recording instruction icon linked to the function of causing the camera 3 to record a shot image is laid out is transferred to the user terminal 4 that made the connection request by taking the opportunity to receive this recording instruction data (step S18). In the embodiment, the page transferred here includes text indicating that the number of times of acceptable recording instruction data is twice (see FIG. 20).

The information control block 114 shares a user ID with the user terminal 4, and registers the user ID in the management information storage block 182 (step S19). The user ID is data in a cookie format including the user name as the destination upon issuing/transmitting the page on which the above-mentioned recording instruction icon is laid out. Then, the management block 112 starts a 60-second timer (step S20).

The information control block 114 determines whether time is up or not (step S21). In the embodiment, it is determined that time is up, for example, when 60 seconds as the predetermined time has passed. When it is determined that time is up (step S21→Yes), the procedure proceeds to step S36. On the other hand, when it is determined that time is not up (step S21→No), the procedure proceeds to step S22.

When determining that time is not up in step S21, the information control block 114 determines whether recording instruction data is received from the user terminal 4 by the user touching the recording instruction icon or not (step S22). When it is determined that recording instruction data is received (step S22→Yes), the procedure proceeds to step S23. On the other hand, when it is determined that recording instruction data is not received (step S22→No), the procedure returns to step S21.

When determining that recording instruction data is received, the information control block 114 executes processing for continuing the countdown (step S23). Then, based on information added to the URL used by the user terminal 4 to establish the communication connection, the identification block 113 of the management block 112 identifies the camera 3 as the target of the present recording instruction (step S24). At this time, the identification block 113 identifies the user terminal 4 as the transmission source of the recording instruction data based on the user ID transmitted and received as a cookie.

Based on a code ID added to the URL used by the user terminal 4 to establish the communication connection, the acceptance control block 116 of the management block 112 determines whether the camera 3 side can accept recording instruction data received from the user terminal 4 or not (step S25). When it is determined that the camera 3 side cannot accept recording instruction data (step S25→No), the procedure proceeds to step S26.

When determining that the camera 3 side cannot accept recording instruction data, the acceptance control block 116 transfers, to the identified user terminal 4, a page indicative of not being able to be accepted (step S26), and the procedure returns to step S21. On the other hand, when it is determined that the camera 3 side can accept recording instruction data, the procedure proceeds to step S27.

The information control block 114 transmits the accepted recording instruction data to the camera 3 as the target of the recording instruction (step S27). After that, the information control block 114 receives recorded image data shot and recorded with the camera 3 according to the recording instruction (step S28).

The information control block 114 registers, in the management information storage block 182, the recorded image data and the number of receptions received in association with the identifier (step S29). This identifier is acquired by the user terminal 4 to perform the recording instruction. When recorded image data is received for the first time after the processing in step S21, "1" is stored in the management information storage block 182 as count information. Similarly, when recorded image data is received for the second time, "2" is stored in the management information storage block 182 as count information.

The information control block 114 determines whether the number of receptions exceeds a preset number of times or not (step S30). When it is determined that the number of receptions does not exceed the preset number of times (step S30→No), information for displaying the page including the recording instruction icon is transferred to the user terminal 4 (step S31). Here, the recording instruction icon is replaced with text indicating that the number of times of acceptable recording instruction data is once on the transferred page.

When it is determined that the number of receptions exceeds the preset number of times (step S30→Yes), the management control block 115 generates information for displaying a confirmation image page (step S32). A confirmation image is generated from the recorded image data based on image data obtained by reducing image information such as the display size, the resolution, and the like. Further, it is desired that the confirmation image page with the confirmation image displayed thereon should have a page structure not to be able to keep the record inside the user terminal 4. The management control block 115 transfers a confirmation image display page to the user terminal 4 that transmitted the recording instruction data (step S33).

The management control block 115 determines whether a transmission request for recorded image data is received from the user terminal 4 or not (step S34). For example, the transmission request is a download request for a recorded image selected by the user. When the transmission request is received (step S34→Yes), corresponding recorded image data is transferred to the user terminal 4 (step S35), and the procedure returns to step S11. On the other hand, when the transmission request for recorded image data is not received (step S34→No), the procedure returns to step S11 without transferring recorded image data.

Next, a case where it is determined in step S21 that time is up will be described. As illustrated in FIG. 13, when it is determined that time is up (step S21→Yes), the procedure shifts to step S36.

When it is determined that time is up, the management control block 115 determines whether recorded image data is registered in the management information storage block 182 or not (step S36). When it is determined that the recorded image data is registered in the management information storage block 182 (step S36→Yes), the procedure proceeds to step S32. On the other hand, when it is determined that recorded image data is not registered in the management information storage block 182 (step S36→No), the procedure proceeds to step S37.

When determining that recorded image data is not registered in the management information storage block 182, the management control block 115 transfers, to the user terminal 4, a notification page to notify the user terminal 4 that time is up (step S37), and erases information on the user ID as the target of the present processing stored in the management information storage block 182 (step S38). After that, the procedure returns to step S11.

Figure 15:
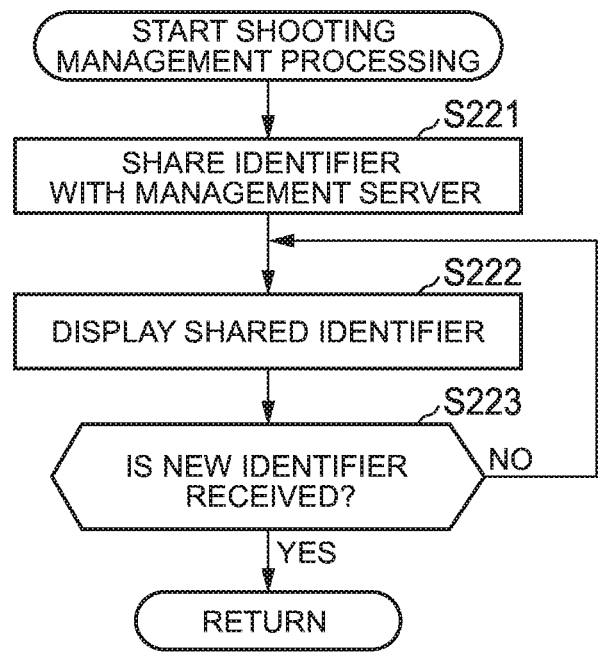
FIG. 15 is a flowchart for describing a flow of the shooting management processing in the display device 2.

One example of the shooting management processing executed by the management server 1 is described above. Referring next to FIG. 15, processing executed by the display device 2 will be described. FIG. 15 is a flowchart for describing a flow of the shooting management processing executed by the display device 2 having the functional configuration of FIG. 9 in the shooting system S.

First, it is assumed that the identifier sharing block 211 is in a state of sharing an identifier with the management server 1 (step S221). Specifically, the display device 2 operates with an identifier transmitted as a shared target from the management server 1.

The display control block 212 executes processing for displaying, on the output unit 27, an identifier as a two-dimensional barcode shared with the management server 1 (step S222). When an E-Ink display is adopted as the output unit 27, the display of the identifier can be continued semipermanently without power supply after voltage is applied only on output.

The identifier sharing block 211 determines whether a new identifier is received from the management server 1 or not (step S223). When it is determined that a new identifier is received (step S223→Yes), the procedure returns to step S221. When it is determined that any new identifier is not received (step S223→No), the procedure returns to step S222 to continue the display of the identifier.

Figure 16:
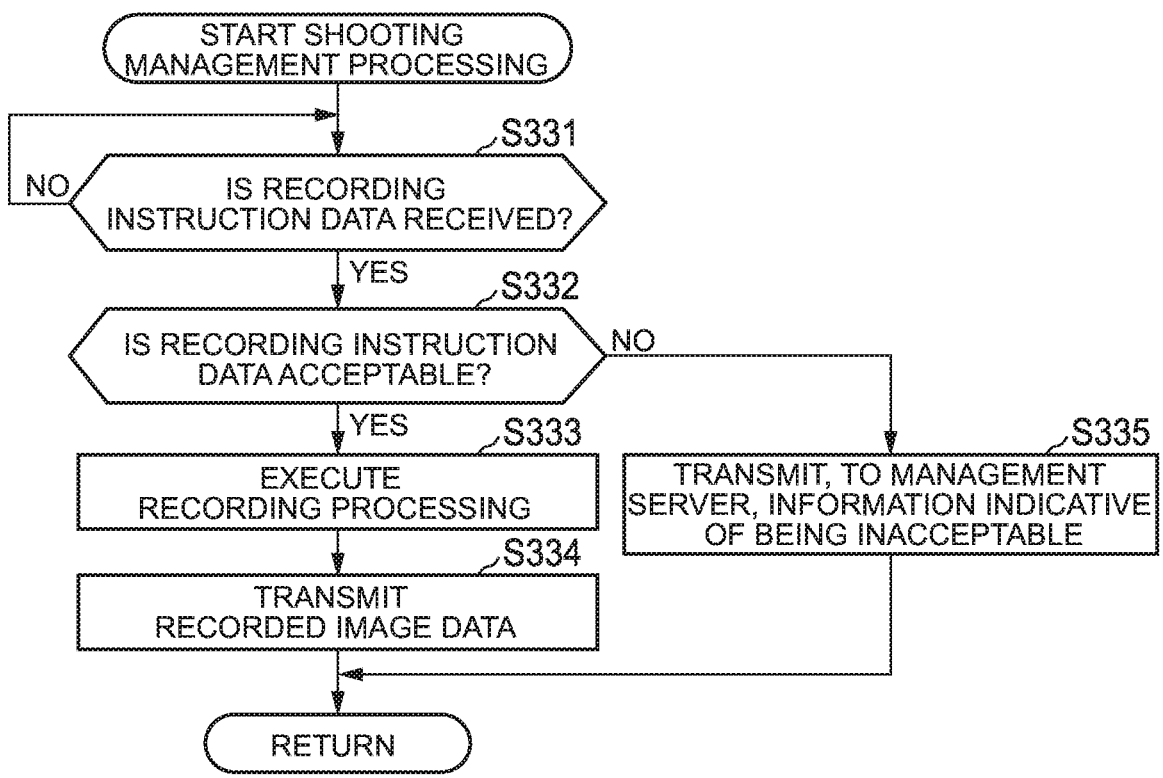
FIG. 16 is a flowchart for describing a flow of the shooting management processing in the camera 3.

Referring next to FIG. 16, processing executed by the camera 3 will be described. FIG. 16 is a flowchart for describing a flow of the shooting management processing executed by the camera 3 having the functional configuration of FIG. 10 in the shooting system S.

The recording instruction response block 311 determines whether recording instruction data is received or not (step S331). When it is determined that recording instruction data is received (step S331→Yes), the procedure proceeds to step S332. On the other hand, when it is determined that recording instruction data is not received (step S331→No), the procedure returns to a state of waiting for acceptance of recording instruction data.

The recording instruction response block 311 determines whether recording instruction data is acceptable or inacceptable (step S332). When it is determined to be acceptable (step S332→Yes), the procedure shifts to step S333. When it is determined to be inacceptable (step S332→No), the procedure shifts to step S335.

When the recording instruction response block 311 determines that recording instruction data is acceptable, the shooting control block 312 executes recording processing (step S333). In the embodiment, a countdown for a predetermined time is performed after recording instruction data is received from the management server 1, and shooting and recording are performed after the countdown.

As a response to the recording instruction data, the recording instruction response block 311 transmits, to the management server 1, recorded image data obtained as a result of shooting and recording (step S334). After that, the procedure returns to step S331.

When determining that recording instruction data is inacceptable (step S332→No), the recording instruction response block 311 transmits, to the management server 1, information indicative of being inacceptable (step S335). After that, the procedure returns to step S331.

Figure 17:
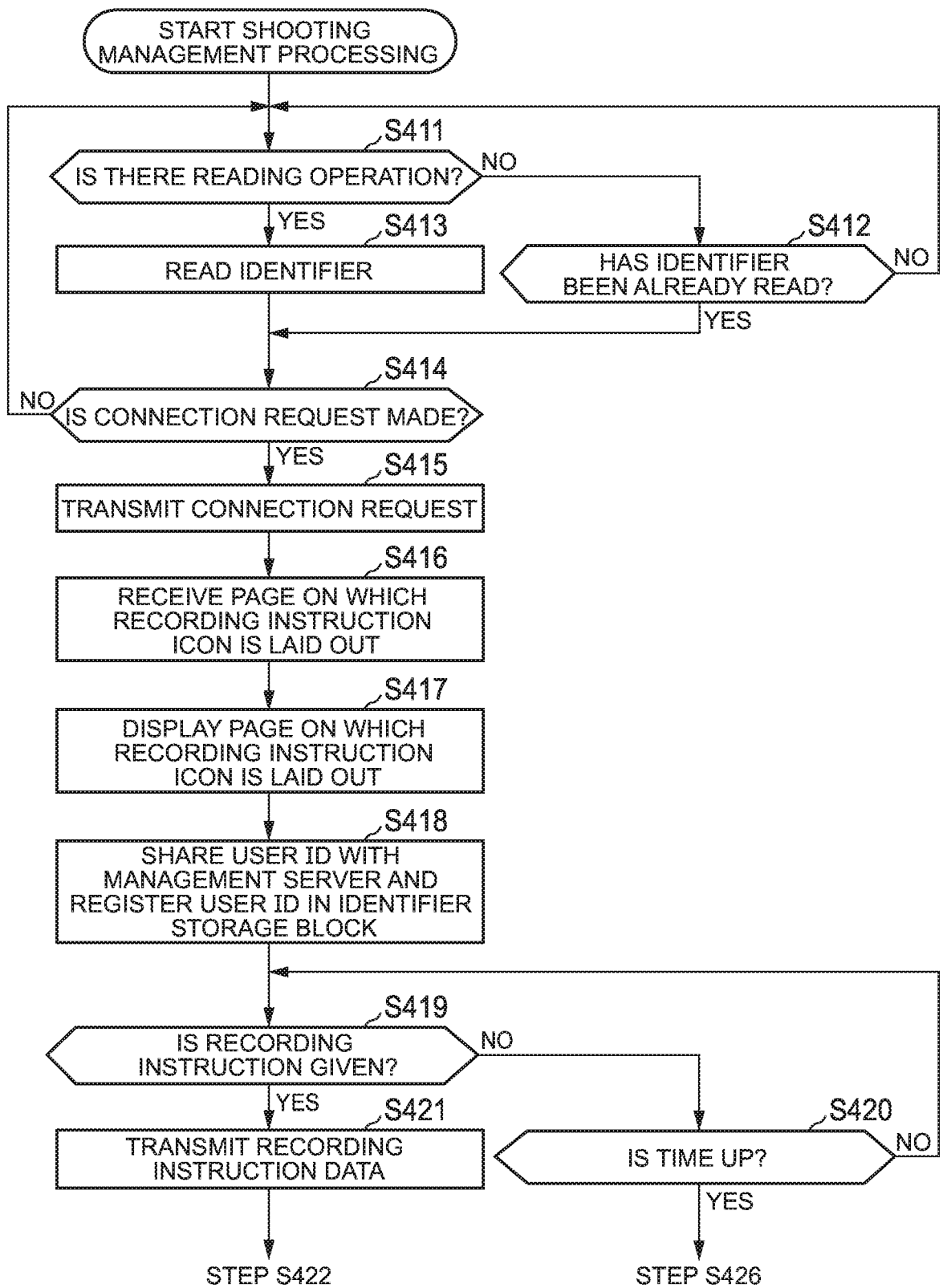
FIG. 17 is a part of a flowchart for describing a flow of the shooting management processing in the user terminal 4.
Figure 18:
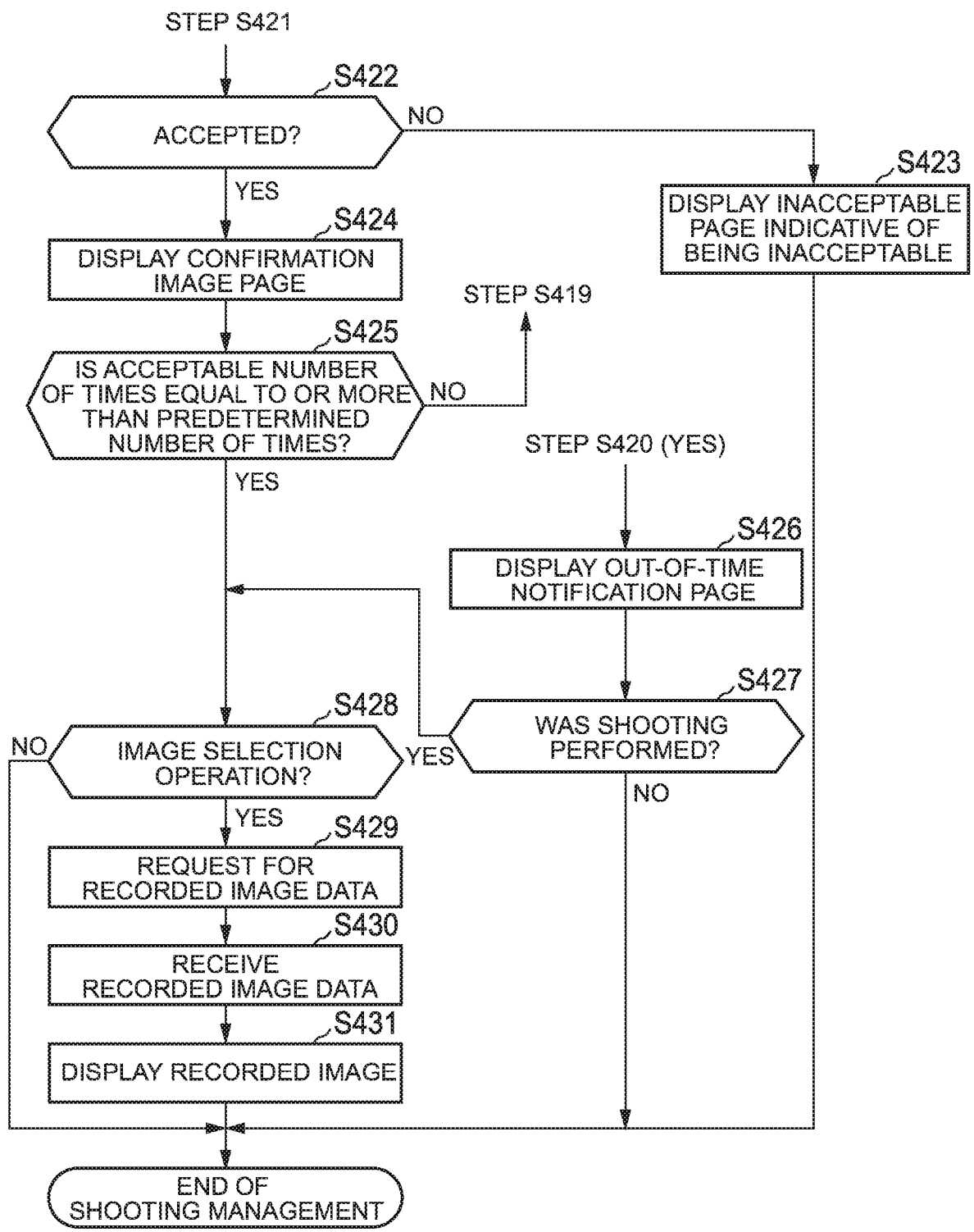
FIG. 18 is the remaining part of the flowchart for describing the flow of the shooting management processing in the user terminal 4.

Referring next to FIG. 17 and FIG. 18, processing executed by the user terminal 4 will be described. FIG. 17 and FIG. 18 are flowcharts for describing a flow of the shooting management processing executed by the user terminal 4 having the functional configuration of FIG. 11 in the shooting system S.

The identifier acquisition block 411 determines whether there is a user's operation to read an identifier or not (step S411). When it is determined that there is a user's operation to read an identifier (step S411→Yes), the procedure proceeds to step S413. On the other hand, when there is no user's operation to read an identifier (step S411→No), the procedure proceeds to step S412. When determining that there is no user's operation to read an identifier, the identifier acquisition block 411 determines whether an identifier has been already read in the past processing or not (step S412). When it is determined that an identifier has been already read (step S412→Yes), the procedure proceeds to step S414. On the other hand, when it is determined that any identifier has not been read yet (step S412→No), the procedure returns to step S411.

When determining that there is a user's operation to read an identifier, the identifier acquisition block 411 reads the identifier displayed on the display device 2 based on this reading operation (step S413).

The recording instruction block 412 determines whether a connection request to the management server 1 from the user is made or not (step S414). When it is determined that the connection request is made (step S414→Yes), the procedure proceeds to step S415. On the other hand, when it is determined that no connection request is made (step S414→No), the procedure returns to step S411.

When determining that the connection request to the management server 1 from the user is made, the recording instruction block 412 transmits the connection request to the management server 1 (step S415), and in response, receives the page on which the recording instruction icon transferred from the management server 1 is laid out (step S416). This recording instruction icon is linked to the function of transmitting recording instruction data to the camera 3 through the management server 1 by detecting a touch operation of the user on the icon and causing the camera 3 to record a shot image by taking the opportunity to receive this recording instruction data.

The recording instruction block 412 displays, on the output unit 47, the page on which the recording instruction icon is laid out (step S417). The recording instruction block 412 shares a user ID with the management server 1, and registers the user ID in the identifier storage block 481 (step S418).

The recording instruction block 412 determines whether a recording instruction from the user is given to the camera 3 or not (step S419). When it is determined that no recording instruction is given (step S419→No), the procedure proceeds to step S420. On the other hand, when it is determined that the recording instruction is given (step S419→Yes), the procedure proceeds to step S421.

When determining that no recording instruction is given, the recording instruction block 412 determines whether time is up or not (step S420). For example, the recording instruction block 412 determines that time is up when receiving a notification page being out of time from the management server 1. When determining that time is up (step S420→Yes), the recording instruction block 412 performs control to display an out-of-time notification page (step S426). Further, the recording instruction block 412 determines whether shooting using the camera 3 was performed or not (step S427). When it is determined that shooting was already performed (step S427→Yes), the procedure proceeds to step S428. On the other hand, when it is determined that shooting was not performed (step S427→No), the shooting management processing on the user terminal 4 is ended. When it is determined in step S420 that time is not up (step S420→No), the procedure returns to step S419.

The recording instruction block 412 transmits, to the management server 1, recording instruction data based on the user's operation (step S421).

The management server 1 receives recording instruction data, and the recording instruction block 412 determines whether a recording instruction based on this recording instruction data is accepted or not (step S422). When determining that the recording instruction is inacceptable (step S422→No), the recording instruction block 412 displays, on the output unit 47, an inacceptable page to indicate that the recording instruction is inacceptable (step S423). Then, the shooting management processing on the user terminal 4 is ended.

When the recording instruction block 412 determines that the recording instruction is accepted by the management server 1 (step S422→Yes), the procedure proceeds to step S424.

The recording instruction block 412 displays the confirmation image page received from the management server 1 (step S424). On the confirmation image page, the confirmation image of an image shot and recorded with the camera 3 as a result of transmitting the recording instruction data from the user terminal 4 to the camera 3 through the management server 1 is laid out.

The recording instruction block 412 determines whether the number of shots of the camera 3 is equal to or more than a predetermined number of times or less than the predetermined number of times (step S425). When it is determined that the number of shots is less than the predetermined number of times (step S425→No), the procedure returns to step S419.

When it is determined that the number of shots is equal to or more than the predetermined number of times (step S425→Yes), the procedure proceeds to step S428.

The recording instruction block 412 determines whether an image selection operation is performed by the user or not (step S428). When it is determined that an image selection is performed by the user (step S428→Yes), the procedure proceeds to step S429. When it is determined that no image selection is performed by the user (step S428→No), the shooting management processing on the user terminal 4 is ended.

The image generation block 413 requests the management server 1 to transmit a recorded image (step S429). The image generation block 413 receives, from the management server 1, the recorded image shot based on the recording instruction (step S430).

The image generation block 413 displays the received recorded image on the output unit 47 (step S431). Then, the shooting management processing on the user terminal 4 is ended.

As described above, according to the shooting management processing of the embodiment, the identifier used to identify both the camera 3 and the user terminal 4 is periodically changed and displayed on the display device 2 near the shooting spot in a format like a two-dimensional barcode. Thus, the user can perform communication control and remote control of the camera 3 to execute shooting/recording merely by using the imaging unit provided in the user terminal 4 to read the displayed identifier.

Further, according to the shooting management processing, an information input device such as the camera 3 in a shared state on the network can be temporarily operated by using the identifier periodically changed. In addition, according to the shooting management processing, since the camera 3 located in a place far away from the user is used to perform shooting, the whole group including a friend(s) can be shot or shooting at an angle difficult for the user terminal to shoot can be performed. Although processing for displaying a recorded image on the user terminal 4 is mainly described above, the same processing is performed when the recorded image is displayed on the external device 5.

[Configuration Examples]

The shooting system S configured above includes the display device 2, the management server 1, the user terminal 4 capable of being carried by the user, and the camera 3.

The display device 2 is a presentation device which presents an identifier while changing identifiers periodically.

The management server 1 is a management device which shares, with the display device 2, the identifier periodically changed by and presented on the display device 2.

The user terminal 4 is a communication device which acquires the identifier presented on the display device 2 when an identifier acquisition operation by the user is detected, and transmits, to the management server 1, the acquired identifier and a recording instruction for acquiring information.

The camera 3 is an information acquisition device operated based on the recording instruction received by the management server 1 to acquire image data.

The management server 1 includes the information control block 114 which performs control to associate the image data acquired with the camera 3 based on the recording instruction transmitted from the user terminal 4 with the identifier presented on the display device 2 when the identifier acquisition operation by the user is detected.

Thus, the identifier is periodically changed so that this identifier can be used as information for identifying both the camera 3 and the user terminal 4. In other words, information on communication protocol-specific connection partners exchanged upon network connection is linked to the control permissions of the network connection devices.

This enables the user to realize communication connection and remote control of the camera 3 by reading the identifier once.

In a conventional general technique, the user needs to read plural two-dimensional barcodes, respectively, to realize communication connection between plural devices, for example, for the purpose of remote control or the like. In other words, the user needs to do reading work many times, and it is complicated for the user. In contrast, according to the present invention, the user can realize remote control between plural devices by reading the identifier once.

The management server 1 further includes the management control block (first management control block) 115 which manages information acquired by the camera 3 operated based on the recording instruction in association with the identified user terminal 4 or the external device 5 corresponding to the identified user terminal 4.

This enables the user to refer to the information acquired by the camera 3 on the device used by the user such as the user terminal 4.

The camera 3 includes an imaging unit which captures an image in a location identified by the identifier as a shooting range. The camera 3 acquires, as information, recorded image data including the user carrying the user terminal 4 in the shooting range based on the recording instruction.

This enables the user to refer to a recorded image shot with the camera 3 to include the user himself or herself.

The recording instruction in the shooting system S includes an instruction to cause the camera 3 to capture images continuously. The management server 1 includes the management control block (second management control block) 115 which manages plural recorded images, captured by the instruction to capture images continuously, in association with the identified user terminal 4 or the external device 5 corresponding to the identified user terminal 4.

This enables the user to refer to recorded images such as continuous still images or a video shot continuously with the camera 3.

The plural recorded images in the shooting system S are plural recorded images recorded upon receipt of the recording instruction. The user terminal 4 or the external device 5 corresponding to the user terminal 4 includes the input unit 46 (selection unit, instruction unit) which selects a specific recorded image from among the captured plural recorded images and instructs the management server 1 to transmit the selected specific recorded image.

This enables the user to refer to the plural recorded images and acquire a desired recorded image through the user terminal 4 or the external device 5. The shooting system S includes plural user terminals 4, and the management server 1 further includes the acceptance control block (first acceptance control block) 116 which, when the camera 3 is identified based on an identifier received from a user terminal 4, performs control not to accept the recording instruction from any user terminal 4 other than the user terminal 4 that transmitted the recording instruction to the identified camera 3. Thus, exclusive use of the camera 3 by each user can be realized.

The shooting system S includes plural user terminals 4, and when the same identifier is transmitted from two or more user terminals 4, the acceptance control block (second acceptance control block) 116 performs control to accept the recording instruction from one user terminal 4 that first transmitted the identifier with priority over the other user terminals 4.

Thus, the order of use of the camera 3 can be determined fairly according to the reading order.

The management server 1 identifies the user terminal 4 and the display device 2 based on the content of an acquired identifier received from the user terminal 4 and the content of a presented identifier shared with the display device 2.

This enables the management server 1 to use the identifier received from the user terminal 4 and the identifier shared with the display device 2 as information for identifying both the camera 3 and the user terminal 4.

[Modifications]

Note that the present invention is not limited to the embodiment described above, various modifications and improvements capable of achieving the object of the present invention are included in the present invention. For example, the above-described embodiment can be modified to contain modifications as illustrated below. Further, modifications illustrated below can also be combined.

<First Modification>

In the embodiment described above, it is assumed that a single still image is shot with the camera 3, but the present invention is not limited thereto. For example, continuous shooting may be performed with the camera 3 to obtain continuous still images or to obtain a video composed of these continuous still images as respective frames. Further, each user may make a selection of which is shot, the single still image, the continuous still images, or the video, based on the recording instruction from the user terminal 4.

This enables the user to shoot a still image or a video selectively according to his or her intention.

Further, continuous still images or a video obtained by shooting may be browseable on the user terminal 4. This enables the user to give the recording instruction at desired timing while using the video or the like to be referred to on the user terminal 4 as a live-view image to check his or her facial expression or pose.

Figure 19:
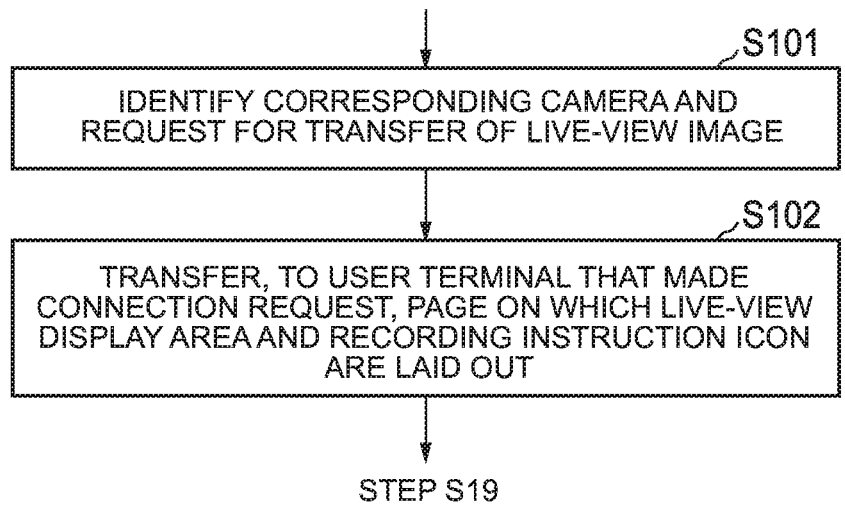
FIG. 19 is a part of a flowchart for describing a flow of live-view display processing in the management server 1.

Specific processing of the first modification will be described. FIG. 19 is a part of a flowchart for describing a flow of live-view display processing by the management server 1. The flowchart illustrated in FIG. 19 is a substitute for processing step S18 in the flowchart of FIG. 12.

In the first modification, after the connection request for the URL corresponding to the identifier is detected in step S17, the procedure proceeds to step S101. The identification block 113 identifies the camera 3 based on the identifier, and the management control block 115 requests the identified camera 3 to transfer a live-view image (step S101).

Figure 20:
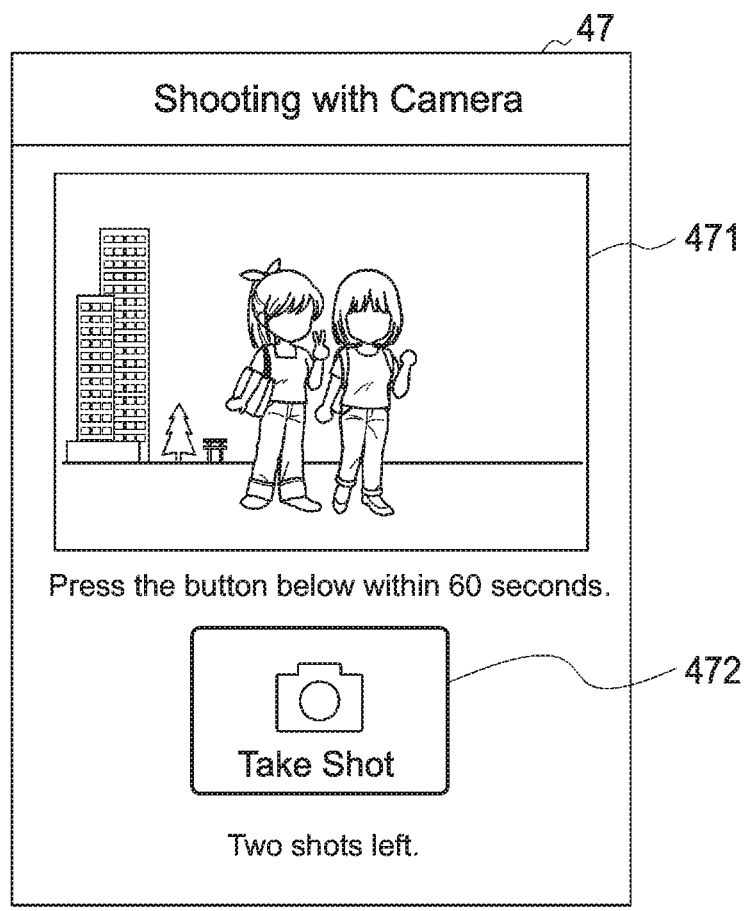
FIG. 20 is a schematic diagram illustrating a display example of a page displayed on the user terminal 4.

In response to the transfer request for a live-view image, the management control block 115 receives the live-view image sequentially transmitted from the camera 3, generates a page on which a live-view display area of displaying the live-view image and the recording instruction icon are laid out, and transmits the page to the user terminal 4 that made the connection request (step S102). FIG. 20 is a schematic diagram illustrating an example of a page transferred from the management server 1 and displayed on the output unit 47 of the user terminal 4 (or the display unit of the external device). A page as illustrated in FIG. 20 is displayed on the user terminal 4 or the external device 5. In the example illustrated in FIG. 20, a live-view image is displayed within the frame of a live-view image 471. In addition to the live-view image 471, a recording instruction icon 472, text indicative of the time available for shooting, and text indicative of the remaining number of shots (twice) are displayed. After processing step S102, the procedure proceeds to step S19. Hereinafter, the same processing as that of the above-mentioned embodiment described with reference to FIG. 12 is executed.

As described above, in the first modification, the management server 1 renders continuously acquired recorded images as a live-view image in such a manner as to be referable on the identified user terminal 4 or the external device 5 corresponding to the identified user terminal 4. Then, the user terminal 4 further includes the communication unit 49 which receives images sequentially captured with the camera 3 and the output unit 47 which displays a live-view image based on the images received by a receiver.

This enables the user to give the recording instruction at desired timing while checking his or her facial expression or pose in the live-view image.

<Second Modification>

In the embodiment described above, the example in which when a recording instruction is accepted, control is performed not to accept another recording instruction of any other user terminal 4 even if a connection request from the user terminal 4 is received is described, but the present invention is not limited thereto. For example, information except for that indicative of being inacceptable may also be provided to the user terminal 4 concerned.

Figure 21:
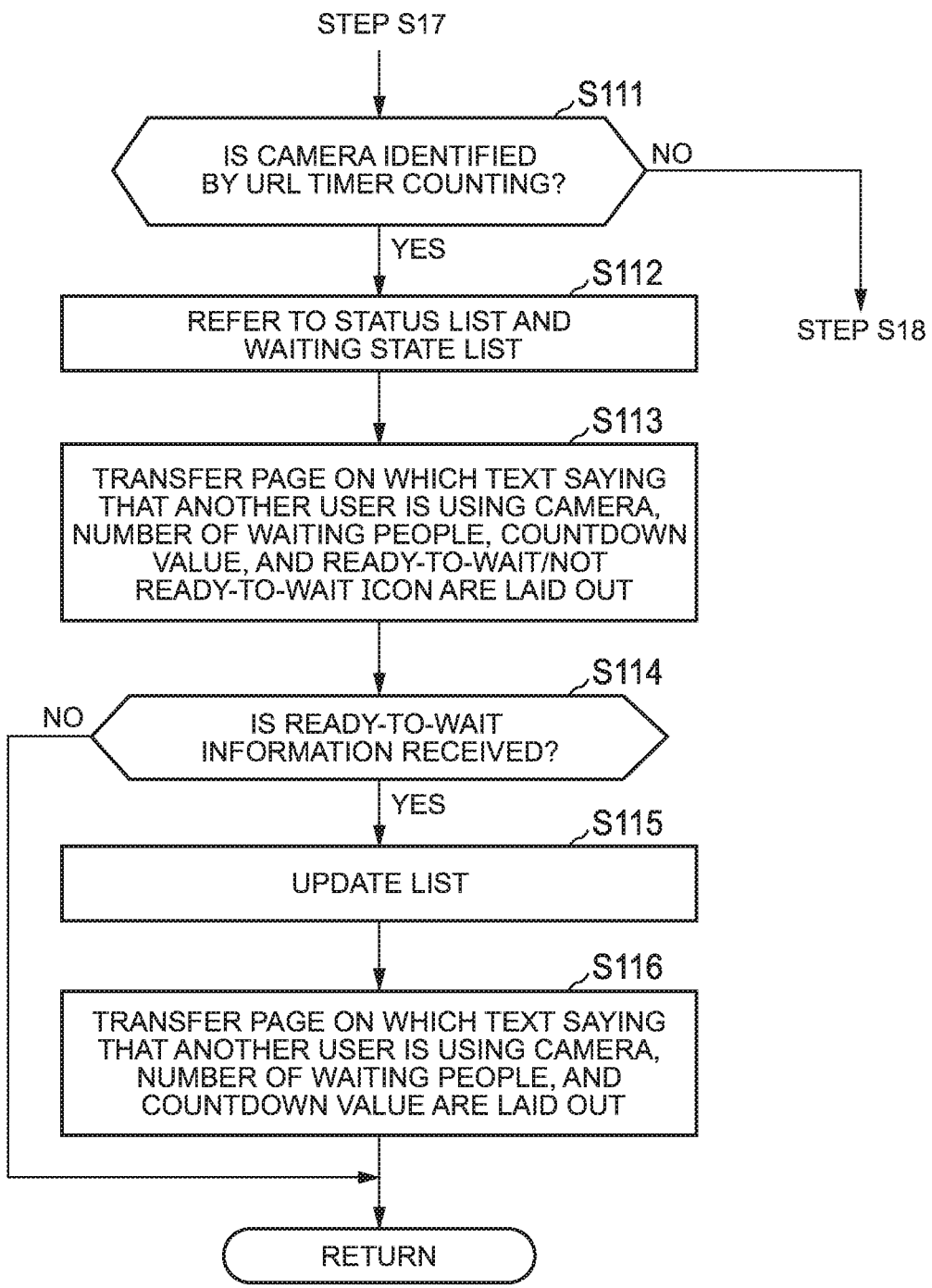
FIG. 21 is a part of a flowchart for describing a flow of processing for managing the number of waiting people in the management server 1.

Specific processing of a second modification will be described. FIG. 21 is a part of a flowchart for describing a flow of processing by the management server 1 to manage the number of waiting people. The flowchart illustrated in FIG. 21 is performed between step S17 and step S18 in the flowchart of FIG. 12.

In the second modification, after the connection request for the URL corresponding to the identifier is detected in step S17, the identification block 113 determines whether the camera 3 at the installation location identified by the URL is timer counting to prepare for shooting at present or not (step S111). When it is determined that the identified camera 3 is timer counting (step S111→Yes), the procedure proceeds to step S112. On the other hand, when it is determined not to be timer counting (step S113→No), the procedure proceeds to step S18.

When determining that the identified camera 3 is timer counting, the identification block 113 refers to a status list 1822 and a waiting state list 1823 of the camera 3 (step S112). The status list 1822 and the waiting state list 1823 are managed in the management information storage block 182. FIG. 22 is a schematic diagram illustrating an example of these lists managed by the management server 1. The status list 1822 of FIG. 22 indicates the status of use (whether to be timer counting or not) of each camera 3, and the waiting state list 1823 indicates whether the camera 3 is available at present or not, or indicates a state of waiting for use (i.e., waiting state) when the camera 3 is unavailable at present.

In FIG. 22, "Code ID" in the status list 1822 is information for identifying the camera 3, and "Count Flag" indicates whether timer counting is being performed at present or not. The code ID corresponding to count flag "0" indicates that the camera 3 identified by this code ID is not timer counting, while the code ID corresponding to count flag "1" indicates that the camera 3 identified by this code ID is timer counting. "User ID" in the waiting state list 1823 identifies the user who operates the user terminal 4. "Transmission Time of Being Ready-to-Wait" indicates the time of transmitting, to the management server 1, that the user terminal 4 is ready to wait. "Waiting Flag" indicates whether a user waiting for use of the camera 3 is present or not, where flag "0" indicates that no user waiting for use is present, and flag "1" indicates a user waiting for use is present. In the example of FIG. 22, the camera 3 identified by code ID "00120" indicates that shooting/recording processing by user ID "abc1" is already completed and anyone can use the camera 3 at present. On the other hand, the camera 3 identified by code ID "00121" and the camera 3 identified by code ID "00122" both indicate that a user waiting for use is present, respectively. Note that two users with respective user IDs "efg1" and "abc1" are waiting for use of the camera 3 identified by code ID "00121" and have already booked use of the camera 3 next, and one user with user ID "abc1" is waiting for use of the camera 3 identified by code ID "00122" and has already booked use of the camera 3 next.

The management control block 115 transfers, to the user terminal 4, a page on which text saying that another user is using the camera 3, the number of waiting people, a countdown value, and a ready-to-wait/not ready-to-wait icon are laid out (step S113).

The management control block 115 determines whether information indicative of being ready to wait is received from the user terminal 4 or not (step S114). When it is determined that the ready-to-wait information is received from the user terminal 4 (step S114→Yes), the procedure proceeds to step S115. When it is determined that the ready-to-wait information is not received from the user terminal 4 (step S114→No), the procedure returns to step S11.

The management control block 115 updates the waiting state list 1823 in such a manner, for example, as to accept that of the latest transmission time of being ready to wait with priority over the others (step S115). As specifically indicated in FIG. 22, the camera 3 being in the waiting state, the user ID of the user terminal 4 that transmitted the ready-to-wait information, and the time at which the user transmitted the ready-to-wait information are input, and the waiting flag of the camera 3 concerned is changed from 0 to 1.

The management control block 115 transfers, to the user terminal 4 that transmitted the ready-to-wait information, a page on which text saying that another user is using the camera 3, the number of waiting people, and a countdown value are laid out (step S116). The number of waiting people is calculated by counting the number of waiting flags for each code ID. After this transfer processing, the procedure returns to step S11.

According to the second modification, the user can grasp the current use status of the camera 3.

<Third Modification>

In the embodiment described above, the identifier displayed by the display device 2 is changed periodically, but the present invention is not limited thereto. Control to stop the display of the identifier during the operation of the camera 3 by the user may be added.

Specific processing of a third modification will be described. FIG. 23 is a part of a flowchart for describing a flow of identifier display stop processing and camera adjustment processing of the display device 2 performed by the management server 1. The flowchart illustrated in FIG. 23 is performed between step S20 and step S21 in the flowchart of FIG. 13.

After the processing for starting the 60-second timer in step S20, the presentation control block 117 transmits, to the display device 2 corresponding to the code ID, an instruction to stop the identifier display (step S121). It is assumed that the display device 2 at this time is displaying the identifier acquired by the user terminal 4 after being acquired.

The presentation control block 117 determines that the 60-second timer is up or not (step S122). When it is determined that the timer is up (step S122→Yes), the procedure proceeds to step S13 to generate a new identifier. On the other hand, when it is determined that the timer is not up (step S122→No), the procedure proceeds to step S123.

When determining that the timer is not up, the presentation control block 117 determines whether recording instruction data from the user terminal 4 is received or not (step S123). When it is determined that no recording instruction is received (step S123→No), the procedure proceeds to the processing for determining whether time is up or not in step S21 of FIG. 13. On the other hand, when it is determined that recording instruction data is received (step S123→Yes), the procedure proceeds to step S124.

The presentation control block 117 transmits, to the display device 2, an instruction to start a 5-second timer (step S124).

The information control block 114 transmits shooting condition adjustment instructions to the camera 3 (step S125), and the procedure proceeds to step S23.

When receiving the adjustment instructions transmitted in step S124, the shooting control block 312 of the camera 3 uses a period in which the display device 2 counts the time by the 5-second timer to execute the shooting condition adjustment processing of the camera 3 during this period. The shooting conditions such as the ISO sensitivity, the shutter speed, and the white balance are adjusted according to the external environment.

The flow of processing for changing the display of the identifier on the display device 2 to the display of the timer start is described above. Next, the timing of displaying another identifier in the third modification will be described. FIG. 24 is a part of a flowchart for describing a flow of identifier display resume processing of the display device 2 performed by the management server 1. The flowchart illustrated in FIG. 24 indicates processing in step 33 and later performed after processing step S32 in the flowchart of FIG. 14, that is, processing on the display device 2 performed after the processing for generating the confirmation image page by the management server 1 and before the processing for transferring the confirmation image page to the user terminal 4.

The information control block 114 generates a new identifier (step S131), and updates the content of the management information storage block 182 (step S132). In other words, the newly generated identifier is registered in the management information storage block 182.

The presentation control block 117 transmits the newly registered identifier to the display device 2 (step S133). The identifier sharing block 211 of the display device 2 registers the received identifier in the identifier storage block 281 to share the identifier between the management server 1 and the display device 2. The display control block 212 of the display device 2 displays the newly shared identifier. In other words, the new identifier is displayed on the display device 2 by taking the opportunity for the user terminal 4 to transmit recording instruction data to the management server 1.

The identifier sharing block 111 starts the timer (step S134). After that, the procedure proceeds to step S17 of FIG. 12 again. The subsequent processing is the same as that in FIG. 12.

As described above, the third modification is configured as follows:

The management server 1 further includes the presentation control block (presentation control block) 117 which controls the display device 2, paired with the camera 3 executing recording processing by recording instruction data, not to present the identifier when the recording instruction data is received.

Thus, the display device 2 paired with the camera 3 during execution of the recording processing no longer presents the identifier. This can prevent any user terminal 4 other than the user terminal 4 that transmitted the recording instruction data from acquiring the same identifier and transmitting the same recording instruction data.

When the recording instruction is received a preset number of times from the user terminal 4 that transmitted the identifier, or when a preset time has passed after the recording instruction was received, the presentation control block 117 controls the display device 2 to resume the presentation of the identifier.

This enables each user to take plural photos during exclusive use of the camera 3.

Further, when the recording instruction data is received, the presentation control block 117 controls the display device 2 paired with the camera 3 that executes recording processing to provide a countdown display beginning at the start of the 5-second timer instead of the identifier according to the received recording instruction data, and to adjust the shooting conditions of the camera 3 during this period.

This enables the user to grasp the time to acquire image data through the display device 2.

Further, the camera 3 can make proper adjustments according to the shooting environment. For example, the exposure at the time of shooting with the camera 3 can be adjusted according to differences in brightness (daytime, evening, night) to acquire image data including the user under proper conditions.

<Fourth Modification>

In the embodiment described above, it is assumed that a recorded image shot with the camera 3 is displayed alone. However, the present invention is not limited thereto, and the recorded image shot with the camera 3 may also be displayed in various ways.

For example, based on the user ID saved as a cookie, a browser of the user terminal 4 may display, in a thumbnail display format or the like, plural recorded images stored in management server 1 and corresponding to this user ID.

Next, specific processing of a fourth modification will be described with reference to FIG. 25 to FIG. 28.

Note that a flow of processing in the fourth modification to be described below is the same as processing step S416 and later in FIG. 17 to describe the processing of the user terminal 4.

When the page on which the recording instruction icon 472 is laid out is received from the management server 1, the recording instruction block 412 displays, on the output unit 47, an image as illustrated in FIG. 25. FIG. 25 illustrates an example of an operation page image displayed in step S417 of FIG. 17. In this example, a touch is so detected that the recording instruction icon 472 used to transmit recording instruction data and text indicative of the number of shots are displayed.

Figure 26:
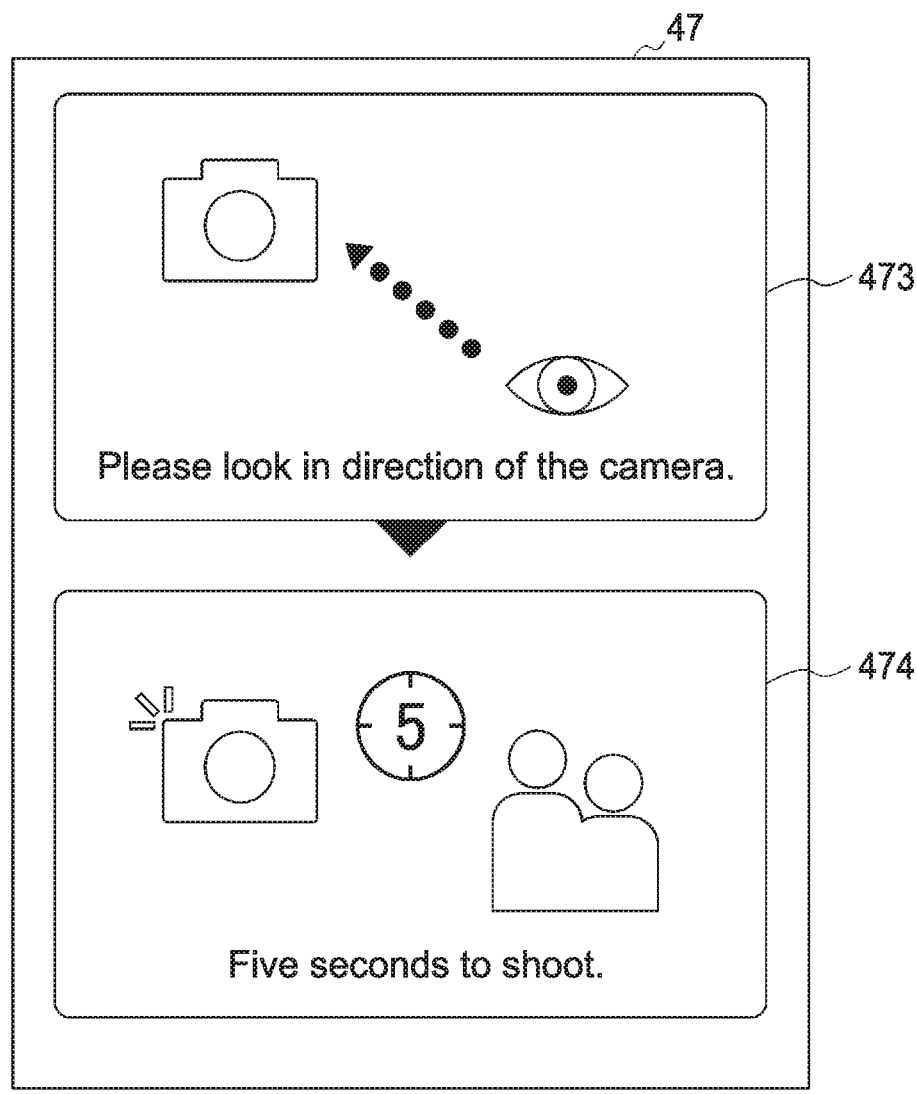
FIG. 26 is a schematic diagram illustrating a display example provided on the user terminal 4.

When the user touching the recording instruction icon 472 is detected, the recording instruction block 412 displays, on the output unit 47, an image to let the user know about shooting and recording. For example, an image illustrated in FIG. 26 is displayed. FIG. 26 is a schematic diagram illustrating an example of a timer display image displayed on the user terminal 4. In FIG. 26, the direction of the camera in a display 473 saying "Please look in the direction of the camera" means the direction of the shooting optical axis. A display 474 saying "Five seconds to shoot" means a count (the number of seconds) until shooting with the camera 3 is performed. A recorded image acquired by the camera 3 performing shooting and recording is transmitted to the management server 1.

Figure 27:
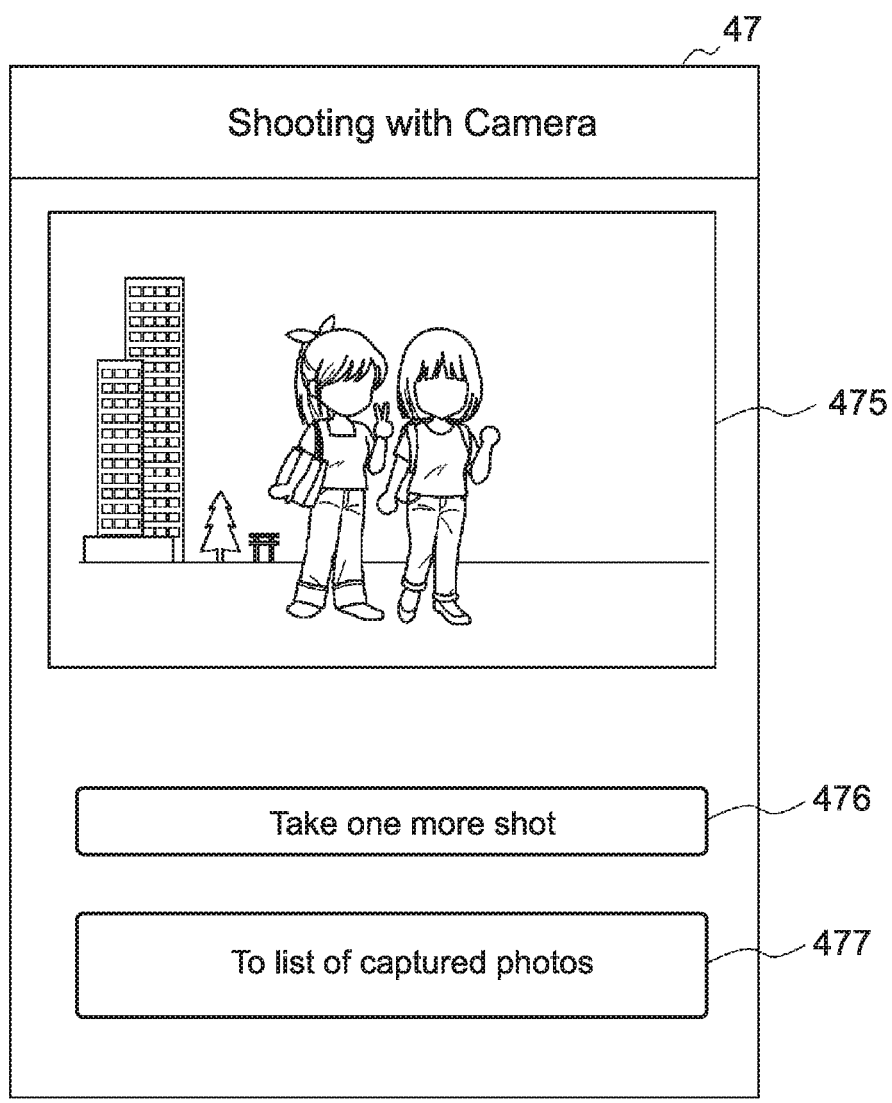
FIG. 27 is a schematic diagram illustrating an example of a shooting completion image displayed on the user terminal 4.

When the confirmation image display page is received from the management server 1, the recording instruction block 412 displays, on the output unit 47, an image as illustrated in FIG. 27. FIG. 27 is a schematic diagram illustrating an example of a shooting completion image displayed on the user terminal 4. A thumbnail image 475 generated based on a recorded image is illustrated in FIG. 27. In addition to the thumbnail image 475, icons 476 and 477 are also displayed to perform the next operation. In this example, the icon 476 used to give an instruction for one more shot, and the icon 477 used to give an instruction for providing a list display of recorded images are displayed.

When the user's touch on the icon 476 to give the instruction for one more shot is detected, the recording instruction block 412 displays the image illustrated in FIG. 25 again. Further, when the user's touch on the icon 477 to give the instruction for checking the list of recorded images is detected, the recording instruction block 412 requests the management server 1 to transmit a page illustrating the list. When receiving the page illustrating the list, the recording instruction block 412 displays, on the output unit 47, images as illustrated in FIG. 28. FIG. 28 is a schematic diagram illustrating an example of a list image of captured photos displayed on the output unit 47 of the user terminal 4.

According to FIG. 28, it is found that two or more thumbnail images 475, 478 acquired with the camera 3 appear on the same page. Further, an icon 479 to proceed to the next step is displayed. When the recording instruction block 412 detects that the user selects an image, the image generation block 413 executes processing for storing the image in the recorded image storage block 482. For example, the image generation block 413 makes a request to the management server 1 for an uncompressed image corresponding to the image selected by the user. The image generation block 413 stores, in the recorded image storage block 482, the image received from the management server 1. This enables the user to check images shot by himself or herself at once. When the user selects the icon 479, the page moves to another page on which questionnaire results are input or the like, and then the shooting management processing is ended.

<Fifth Modification>

In the embodiment described above, it is assumed that only a recorded image shot with the camera 3 is displayed. However, the present invention is not limited thereto, and any other information may also be displayed.

For example, when there are many shooting spots such as in an amusement park or a sightseeing spot, cameras 3 are installed at respective shooting spots. Then, information on how many cameras 3 among these plural cameras 3 are used to take photos and obtain recorded images (or how many cameras 3 among these plural cameras 3 are used to take photos but not to obtain recorded images) may be displayed.

This enables the user to more enjoy shooting with the cameras 3 in such a manner as to aim to go around all the plural shooting spots in the amusement park or the like.

In addition, for example, the management server 1 may synthesize at least parts of two or more recorded images corresponding to this user ID and display a synthesized recorded image. In other words, the recorded image may be displayed as a collage image. Further, in this case, a previously crated image material (for example, a character image or the like related to a shooting spot, or the like) may further be synthesized. This enables the user to enjoy images shot by himself or herself as one image. Particularly, when there are many shooting spots and cameras 3 are installed at respective spots, the user can obtain such an image as to express that the user visited various spots.

In addition, for example, when any person other than the user of the user terminal 4 appears in a recorded image, the management server 1 may defocus an image area corresponding to this person or apply a mosaic to the image area. For example, when a live-view display is provided like in the third modification described above, it is assumed that persons present in a focused area based on the recording instruction from the user terminal 4 by the user are the user and his or her friend(s). Alternatively, it is assumed that persons present in a preset area such as a central area of the angle of view of the camera 3 are the user and his or her friend(s).

Then, an image area corresponding to any other person present in any other area may be defocused or applied with a mosaic.

This fifth modification is configured as follows:

The shooting system S includes plural cameras 3, and the management server 1 includes the management control block (third management control block) 115 which manages at least either the number of cameras 3 that accepts a recording instruction or the number of cameras 3 that does not accept the recording instruction in association with the user terminal 4 or the external device 5 corresponding to the user terminal 4.

This enable the user to more enjoy shooting with the cameras 3 in such a manner as to aim to go around plural shooting spots in the amusement park or the like.

Further, the management server 1 further includes the management control block (fourth management control block) 115 which synthesizes parts of pieces of information acquired respectively by the plural cameras 3 based on the recording instructions to manage synthesized information in a manner to be able to be referred to on the identified user terminal 4 or the external device 5 corresponding to the identified user terminal 4.

This enables the user to more enjoy images shot by himself or herself as one image.

<Sixth Modification>

In the embodiment described above, after recording instruction is given from the user on the user terminal 4, the management server 1 determines whether this recording instruction is accepted or not. However, the present invention is not limited thereto, and this determination may be made by any other method.

For example, the user terminal 4 and the management server 1 communicate with each other periodically regardless of the presence or absence of a recording instruction from the user to confirm whether it is in a state of being able to accept the recording instruction or not. Then, after it is confirmed that the recording instruction is acceptable, a screen used to accept the recording instruction may be displayed on the user terminal 4 for the first time.

This can prevent from giving a recording instruction meaninglessly regardless of the fact that any recording instruction from the user is not acceptable.

Further, in the state where any recording instruction is inacceptable, information on how many user terminals 4 capable of being identified based on the number of identifiers previously displayed (that is, the number of user terminals 4 waiting for giving their recording instructions) may be displayed. This enables the user to grasp how long to wait for shooting with the camera 3.

In other words, this modification can improve user friendliness.

<Seventh Modification>

In the embodiment described above, it is assumed that the target to which a recording instruction is given is the camera 3, and a recorded image is obtained by the camera 3. However, the present invention is not limited thereto, and any information acquisition device other than the camera 3 may be targeted for a recording instruction to obtain information.

For example, an information acquisition device such as a recording device for acquiring sound or a sensor for detecting temperature or the like may be targeted for a recording instruction. This enables the user to obtain information such as sound or temperature based on the recording instruction in a manner to be able to be referred to on the user terminal 4.

[Other Modifications]

The series of processing described above can be executed in hardware or software.

In other words, the functional configurations of FIG. 7, FIG. 9, FIG. 10, and FIG. 11 are just illustrative examples, and the present invention is not particularly limited thereto. The functional configuration may be enough as long as the shooting system S includes functions capable of executing the above-described series of processing as a whole, and which functional block is used to realize each of the functions is not particularly limited to each of the examples of FIG. 7, FIG. 9, FIG. 10, and FIG. 11.

Further, one functional block may be configured as a single hardware component, a single software component, or a combination thereof.

The functional configuration in the embodiment is implemented by a processor which executes arithmetic processing, and processors capable of being used in the embodiment includes a processor configured by each of various single processing units such as a single processor, a multiprocessor, or a multi-core processor, and a combination of respective of these various processing units with a processing circuit such as ASIC (Application Specific Integrated Circuit) or FPGA (Field-Programmable Gate Array).

When the series of processing is executed by software, a program to implement the software is installed on a computer or the like from a network or a recording medium.

The computer may be a computer incorporated in dedicated hardware. Further, the computer may be, for example, a computer on which various programs are installed to execute various functions such as a general-purpose personal computer.

In addition to the removable medium 101 in FIG. 2 distributed separately from the device body to provide the program to the user, the recording medium including such a program may be a recording medium provided to the user in a state where the recording medium is incorporated in the device body in advance. The removable medium 101 is, for example, a magnetic disk (including a floppy disk), an optical disk, a magneto-optical disk, or the like. The optical disk is, for example, a CD-ROM (Compact Disk-Read Only Memory), a DVD (Digital Versatile Disk), a Blu-ray (registered trademark) a Disc (Blu-ray disk), or the like. The magneto-optical disk is an MD (Mini-Disk) or the like. Further, the recording medium provided to the user in a state of being incorporated in the device body is, for example, each of the ROM 12, the ROM 22, the ROM 32, and the ROM 42 in which the program is recorded in FIG. 3, FIG. 4, FIG. 5, and FIG. 6, or a hard disk or the like included in each of the storage unit 18, the storage unit 28, the storage unit 36, and the storage unit 48.

In this specification, a step of writing a program recorded on the recording medium may include processing executed in parallel or individually without being necessarily performed in chronological order as well as processing performed chronologically in this order.

While the embodiment and some modifications of the present invention have been described, these embodiment and modifications are not to limit the technical scope of the present invention. The present invention can carry out any other embodiment and modifications and can combine the aforementioned embodiment with each of the modifications. Further, various omissions and replacements can be made without departing from the scope of the present invention. These embodiments and modifications are included in the scope of the invention described in this specification and in the scope equivalent to that of the invention described in the scope of claims.

What is claimed is:

1. An information processing system comprising:
 a presentation device configured to present an identifier and to change the identifier periodically;
 a management device configured to share the identifier with the presentation device; and
 a communication device configured to acquire the identifier presented on the presentation device when an identifier acquisition operation by a user is detected, and to transmit (i) related information of the acquired identifier and (ii) operation instruction information to operate an information acquisition device identified by the acquired identifier, to the management device,
 wherein:
 the management device has a processor configured to identify the information acquisition device based on the related information of the identifier received from the communication device, and to operate the identified information acquisition device based on the operation instruction information received from the communication device; and
 when the management device receives the related information of the identifier and the operation instruction information, the processor of the management device controls the presentation device sharing the received related information of the identifier not to present the identifier.

2. The information processing system according to claim 1, wherein the processor of the management device further manages information acquired by the information acquisition device based on the operation instruction information in association with one of the communication device and an external device corresponding to the communication device.

3. The information processing system according to claim 1, wherein:

the information acquisition device includes an imaging unit configured to capture an image in a location identified by the identifier as a shooting range, and the information acquisition device has a processor configured to control the imaging unit so as to capture an image with a user included in the shooting range based on the operation instruction information and to cause the information acquisition device to acquire the captured image.

4. The information processing system according to claim 3, wherein:

the operation instruction information includes an instruction to cause the imaging unit to capture images continuously, and the processor of the management device manages a plurality of images, captured by the instruction to capture images continuously, in association with one of the communication device and an external device corresponding to the communication device.

5. The information processing system according to claim 4, wherein:

each of the communication device and the external device corresponding to the communication device has a processor, and the processor of one of the communication device and the external device corresponding to the communication device selects a specific image from the plurality of captured images, and instructs the management device to transmit the selected specific image.

6. The information processing system according to claim 3, wherein the communication device further includes:

a receiver configured to receive images sequentially captured by the imaging unit; and a display configured to display a live-view image based on the images received by the receiver.

7. The information processing system according to claim 1, further comprising a plurality of communication devices each corresponding to the communication device, wherein when the information acquisition device is identified based on the related information of the identifier received from a first communication device among the plurality of communication devices, the processor of the management device performs control not to accept operation instruction information from any communication device other than the first communication device.

8. The information processing system according to claim 1, wherein when one of (i) the operation instruction information is received a preset number of times from the communication device that transmitted the related information of the identifier, and (ii) a preset time has passed after the operation instruction information was received, the processor of the management device controls the presentation device to resume the presentation of the identifier.

9. The information processing system according to claim 1, wherein when the related information of the identifier and the operation instruction information are received, the processor of the management device controls the presentation device sharing the identifier corresponding to the received related information of the identifier to present a time to execute information acquisition processing by the information acquisition device, instead of the identifier.

10. The information processing system according to claim 9, wherein when the information acquisition device receives the operation instruction information through the management device, the processor of the management device controls the information acquisition device to make an adjustment related to information acquisition processing before the information acquisition device executes the information acquisition processing.

11. The information processing system according to claim 1, further comprising a plurality of communication devices each corresponding to the communication device, wherein when related information of a same identifier is transmitted from plural communication devices among the plurality of communication devices, the processor of the management device performs control to accept the operation instruction information from a communication device among the plural communication devices that first transmitted the related information of the identifier with priority over the other communication devices among the plural communication devices.

12. The information processing system according to claim 1, further comprising a plurality of information acquisition devices, each each corresponding to the information acquisition device, wherein the processor of the management device manages one of a number of the information acquisition devices that accept the operation instruction information and a number of the information acquisition devices that do not accept the operation instruction information in association with one of the communication device and an external device corresponding to the communication device.

13. An information processing method performed by a system including a presentation device, a management device, and a communication device, the method comprising:

causing the presentation device to present an identifier and to change the identifier periodically;

causing the presentation device and the management device to share the identifier presented on the presentation device with each other;

causing the communication device to acquire the identifier presented on the presentation device when an identifier acquisition operation by a user is detected, and to transmit, to the management device, (i) related information of the acquired identifier and (ii) operation instruction information to operate an information acquisition device identified by the acquired identifier; and causing the management device to identify the information acquisition device based on the related information of the identifier received from the communication device, and to operate the identified information acquisition device based on the operation instruction received from the communication device, wherein when the management device receives the related information of the identifier and the operation instruction information, the processor of the management device controls the presentation device sharing the received related information of the identifier not to present the identifier.

14. A non-transitory computer-readable recording medium with a program stored therein, the program being executable to control a computer of a management device connected to a presentation device and a communication device to execute processes comprising:

sharing an identifier periodically changed by and presented on the presentation device;

receiving, from the communication device that acquires the identifier presented on the presentation device, (i) related information of the acquired identifier and (ii)

operation instruction information to operate an information acquisition device identified by the acquired identifier;

identifying the information acquisition device based on the related information of the identifier received from the communication device;

operating the identified information acquisition device based on the operation instruction received from the communication device; and when the related information of the identifier and the operation instruction information are received, controlling the presentation device sharing the received related information of the identifier not to present the identifier.

15. A management device connected to a presentation device and a communication device, and comprising a processor, the processor of the management device being configured to:

share an identifier periodically changed by and presented on the presentation device;

receive, from the communication device that acquires the identifier presented on the presentation device, (i) related information of the acquired identifier and (ii) operation instruction information to operate an information acquisition device identified by the acquired identifier;

identify the information acquisition device based on the related information of the identifier received from the communication device;

operate the identified information acquisition device based on the operation instruction received from the communication device; and when the related information of the identifier and the operation instruction information are received, control the presentation device sharing the received related information of the identifier not to present the identifier.

16. The management device according to claim 15, wherein the processor is configured to manage information acquired by the information acquisition device based on the operation instruction information in association with one of the communication device and an external device corresponding to the communication device.

17. The management device according to claim 15, wherein:

the information acquisition device includes an imaging unit configured to capture an image in a location identified by the identifier as a shooting range, and the information acquisition device has a processor configured to control the imaging unit so as to capture an image with a user included in the shooting range based on the operation instruction information and to cause the information acquisition device to acquire the captured image.

18. The management device according to claim 15, wherein:

the operation instruction information includes an instruction to cause the imaging unit to capture images continuously, and the processor is configured to manage a plurality of images, captured by the instruction to capture images continuously, in association with one of the communication device and an external device corresponding to the communication device.

19. The management device according to claim 15, wherein:

the management device is connected to a plurality of information acquisition devices each corresponding to the image acquisition device, and the processor is configured to manage one of a number of the information acquisition devices that accept the operation instruction information and a number of the information acquisition devices that do not accept the operation instruction information in association with one of the communication device and an external device corresponding to the communication device.

* * * * *

UNITED STATES PATENT AND TRADEMARK OFFICE
CERTIFICATE OF CORRECTION

PATENT NO. : 11,496,685 B2
APPLICATION NO. : 17/006185
DATED : November 8, 2022
INVENTOR(S) : Taku Koreki et al.

It is certified that error appears in the above-identified patent and that said Letters Patent is hereby corrected as shown below:

In the Claims

Column 32, Line 19, Claim 12, delete "devices, each each" and insert -- devices each --.

Signed and Sealed this
Twenty-first Day of February, 2023

Katherine Kelly Vidal
*Director of the United States Patent and Trademark Office*